(12) United States Patent
Kean et al.

(10) Patent No.: US 8,095,113 B2
(45) Date of Patent: Jan. 10, 2012

(54) ONETIME PASSWORDS FOR SMART CHIP CARDS

(75) Inventors: Brian Kean, Missouri Valley, IA (US); Christopher T. Cox, Denver, CO (US)

(73) Assignee: First Data Corporation, Greenwood Village, CO (US)

( * ) Notice: Subject to any disclaimer, the term of this patent is extended or adjusted under 35 U.S.C. 154(b) by 158 days.

(21) Appl. No.: 12/365,697

(22) Filed: Feb. 4, 2009

(65) Prior Publication Data
US 2009/0200371 A1 Aug. 13, 2009

Related U.S. Application Data

(63) Continuation-in-part of application No. 11/873,611, filed on Oct. 17, 2007.

(51) Int. Cl.
*H04M 1/66* (2006.01)
(52) U.S. Cl. ........ 455/410; 455/411; 455/406; 455/408; 705/41; 705/44; 705/67
(58) Field of Classification Search .................. 705/14.3, 705/44, 67, 41, 14.63, 14.65; 235/379–380, 235/492–493; 726/4–6; 455/410–411
See application file for complete search history.

(56) References Cited

U.S. PATENT DOCUMENTS

| | | |
|---|---|---|
| 3,599,151 A | 8/1971 | Harr |
| 3,833,395 A | 9/1974 | Gosnell |
| 4,321,672 A | 3/1982 | Braun et al. |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |
| 4,722,554 A | 2/1988 | Pettit |
| 4,812,628 A | 3/1989 | Boston et al. |
| 4,902,881 A | 2/1990 | Janku |

(Continued)

FOREIGN PATENT DOCUMENTS
EP  0 481 135 A1  4/1992
(Continued)

OTHER PUBLICATIONS

Business Wire, "E-Commerce, Email and E-Greeting Cards Combine in New Web Site Designed by Interactive Bureau, Flooz.com Features a Fun Online Gift Currency You Send by Email for Any Occasion," 2 pages, Sep. 14, 1999.

(Continued)

*Primary Examiner* — Kamran Afshar
*Assistant Examiner* — Kathy Wang-Hurst
(74) *Attorney, Agent, or Firm* — Kilpatrick Townsend & Stockton LLP

(57) ABSTRACT

A financial transaction card is provided according to various embodiments described herein. The financial transaction card includes a card body with at least a front surface and a back surface. The financial transaction card may also include a near field communications transponder and/or a magnetic stripe, as well as a digital display configured to display alphanumeric characters on the front surface of the card body. The financial transaction card may also include a processor that is communicatively coupled with the near field communications transponder or magnetic stripe and the digital display. The processor may be configured to calculate one-time passwords and communicate the one-time passwords to both the near filed communications transponder or magnetic stripe and the digital display.

8 Claims, 16 Drawing Sheets

U.S. PATENT DOCUMENTS

| | | |
|---|---|---|
| 4,961,142 A | 10/1990 | Elliott et al. |
| 5,053,607 A | 10/1991 | Carlson et al. |
| 5,119,293 A | 6/1992 | Hammond |
| 5,175,682 A | 12/1992 | Higashiyama et al. |
| 5,220,501 A | 6/1993 | Lawlor et al. |
| 5,233,167 A | 8/1993 | Markman et al. |
| 5,276,311 A | 1/1994 | Hennige |
| 5,367,452 A | 11/1994 | Gallery et al. |
| 5,408,077 A | 4/1995 | Campo et al. |
| 5,412,192 A | 5/1995 | Hoss |
| 5,426,594 A | 6/1995 | Wright et al. |
| 5,464,971 A | 11/1995 | Sutcliffe et al. |
| 5,484,988 A | 1/1996 | Hills et al. |
| 5,491,325 A | 2/1996 | Huang et al. |
| 5,498,859 A * | 3/1996 | Farmont .................... 235/384 |
| 5,504,677 A | 4/1996 | Pollin |
| 5,510,979 A | 4/1996 | Moderi et al. |
| 5,555,496 A | 9/1996 | Tackbary et al. |
| 5,577,109 A | 11/1996 | Stimson et al. |
| 5,590,038 A | 12/1996 | Pitroda |
| 5,622,388 A | 4/1997 | Alcordo |
| 5,650,604 A | 7/1997 | Marcous et al. |
| 5,657,201 A | 8/1997 | Kochis |
| 5,677,955 A | 10/1997 | Doggett et al. |
| 5,679,940 A | 10/1997 | Templeton et al. |
| 5,699,528 A | 12/1997 | Hogan |
| 5,757,917 A | 5/1998 | Rose et al. |
| 5,794,207 A | 8/1998 | Walker et al. |
| 5,815,657 A | 9/1998 | Williams et al. |
| 5,825,617 A | 10/1998 | Kochis et al. |
| 5,826,241 A | 10/1998 | Stein et al. |
| 5,828,875 A | 10/1998 | Halvarsson et al. |
| 5,832,463 A | 11/1998 | Funk |
| 5,878,211 A | 3/1999 | Delagrange et al. |
| 5,884,271 A | 3/1999 | Pitroda |
| 5,893,080 A | 4/1999 | McGuri et al. |
| 5,910,988 A | 6/1999 | Ballard |
| 5,949,044 A | 9/1999 | Walker et al. |
| 5,960,412 A | 9/1999 | Tackbary et al. |
| 5,987,426 A | 11/1999 | Goodwin, III |
| 6,029,150 A | 2/2000 | Kravitz |
| 6,030,000 A | 2/2000 | Diamond |
| 6,032,133 A | 2/2000 | Hilt et al. |
| 6,032,137 A | 2/2000 | Ballard |
| 6,039,245 A | 3/2000 | Symonds et al. |
| 6,058,417 A | 5/2000 | Hess et al. |
| 6,064,990 A | 5/2000 | Goldsmith |
| 6,070,798 A | 6/2000 | Nethery |
| 6,097,834 A | 8/2000 | Krouse et al. |
| 6,106,020 A | 8/2000 | Leef et al. |
| 6,119,106 A | 9/2000 | Mersky et al. |
| 6,122,625 A | 9/2000 | Rosen |
| 6,131,811 A | 10/2000 | Gangi |
| 6,149,056 A | 11/2000 | Stinson et al. |
| 6,164,528 A | 12/2000 | Hills et al. |
| 6,175,823 B1 | 1/2001 | Van Dusen |
| 6,193,152 B1 | 2/2001 | Fernando et al. |
| 6,199,761 B1 | 3/2001 | Drexler |
| 6,230,971 B1 * | 5/2001 | Matsumoto et al. .......... 235/380 |
| 6,246,996 B1 | 6/2001 | Stein et al. |
| 6,257,469 B1 | 7/2001 | Cohn |
| 6,293,462 B1 | 9/2001 | Gangi |
| 6,305,604 B1 | 10/2001 | Ono |
| 6,308,887 B1 | 10/2001 | Korman et al. |
| 6,321,984 B1 | 11/2001 | McCall et al. |
| 6,327,570 B1 | 12/2001 | Stevens |
| 6,327,575 B1 | 12/2001 | Katz |
| 6,360,254 B1 | 3/2002 | Linden et al. |
| 6,367,693 B1 | 4/2002 | Novogrod |
| 6,402,029 B1 | 6/2002 | Gangi |
| 6,484,936 B1 | 11/2002 | Nicoll et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,705,520 B1 | 3/2004 | Pitroda et al. |
| 6,769,607 B1 | 8/2004 | Pitroda et al. |
| 6,827,260 B2 | 12/2004 | Stoutenburg et al. |
| 6,886,742 B2 | 5/2005 | Stoutenburg et al. |
| 6,904,526 B1 | 6/2005 | Hongwei |
| 6,925,439 B1 | 8/2005 | Pitroda |
| 6,938,821 B2 | 9/2005 | Gangi |
| 7,086,584 B2 | 8/2006 | Stoutenburg et al. |
| 2001/0045454 A1 | 11/2001 | Gangi |
| 2001/0051876 A1 | 12/2001 | Seigel et al. |
| 2002/0153414 A1 | 10/2002 | Stoutenburg et al. |
| 2004/0126284 A1 | 7/2004 | Lilly et al. |
| 2004/0144846 A1 | 7/2004 | Lasch et al. |
| 2004/0169087 A1 | 9/2004 | Lasch et al. |
| 2005/0198534 A1* | 9/2005 | Matta et al. .................... 713/201 |
| 2005/0211760 A1 | 9/2005 | Dewan et al. |
| 2006/0278697 A1* | 12/2006 | Lovett ........................... 235/380 |
| 2007/0028109 A1 | 2/2007 | Wysocki et al. |
| 2007/0043681 A1* | 2/2007 | Morgan et al. .................. 705/67 |
| 2007/0084913 A1 | 4/2007 | Weston |
| 2007/0125838 A1 | 6/2007 | Law et al. |
| 2007/0178881 A1* | 8/2007 | Teunissen et al. ............. 455/410 |
| 2007/0241182 A1* | 10/2007 | Buer ............................. 235/380 |
| 2007/0262134 A1* | 11/2007 | Humphrey et al. ........... 235/379 |
| 2008/0040274 A1 | 2/2008 | Uzo |
| 2008/0208746 A1* | 8/2008 | Royyuru et al. ................ 705/44 |
| 2008/0307507 A1 | 12/2008 | Conley et al. |
| 2009/0048971 A1* | 2/2009 | Hathaway et al. .............. 705/41 |
| 2009/0104888 A1 | 4/2009 | Cox |
| 2009/0328165 A1* | 12/2009 | Cook et al. ........................ 726/6 |

FOREIGN PATENT DOCUMENTS

| | | |
|---|---|---|
| EP | 0 766 852 A1 | 2/1997 |
| EP | 0 949 596 A2 | 10/1999 |
| EP | 1 077 436 A2 | 2/2001 |
| EP | 1 477 943 A2 | 11/2004 |
| WO | WO 00/46725 A1 | 8/2000 |
| WO | WO 00/67177 A2 | 11/2000 |
| WO | WO 01/04816 A1 | 1/2001 |
| WO | WO 01/37200 A1 | 5/2001 |
| WO | WO 02/05195 A1 | 1/2002 |

OTHER PUBLICATIONS

Confinity, Inc., "How PayPal.com Works," http://www.paypal.com/cgi-bin/webscr?cmd=paypal-works, 2 pages, 2000.

dotBank by Arthas Corp., "The Way to Send and Receive Money on the Internet," http://www.dotbank.com, 7 pages, 1999.

Idealab, "payme.com," https://ssl.idealab.com, 7 pages, downloaded on Feb. 16, 2000.

PR Newswire, GiftSpot.com Simplifies Gift-Giving on the Internet, 5 pages, Oct. 20, 1999.

Verifone Finance, "Tranz 300—Fast, Low-Cost Transaction Automation At the Point of Service," http://web.archive.org/web/19990219180438/http://www.vfi-finance.com/tranz330.htm, 3 pages, Jan. 1999.

X.com, "Do More With Your Money," http://www.x.com, 5 pages, downloaded on Feb. 7, 2000.

PCT International Search Report and Written Opinion mailed Dec. 19, 2008, International Application No. PCT/US2008/080017, 10 pages.

* cited by examiner

ONETIME PASSWORDS FOR SMART CHIP CARDS

CROSS-REFERENCES TO RELATED APPLICATIONS

This application is a continuation-in-part of co-pending, commonly assigned U.S. patent application Ser. No. 11/873,611, filed Oct. 17, 2007, entitled "Passwords For Mobile Wallets," the entirety of which is herein incorporated by reference for all purposes.

BACKGROUND

Embodiments generally relate to payment systems. More specifically, embodiments relate to payment systems supporting use of mobile electronic devices using user passwords in various types of financial transactions.

Today, merchants and service providers accept many forms of payment. Many merchants will accept cash, credit cards, debit cards, stored-value cards, checks, and/or promotional items, such as coupons. All of these forms of payment are often carried by a consumer because some merchants and/or service providers may only accept some of the various possible forms of payment. Sometimes a customer may not pre-plan a visit to a specific merchant and/or service provider, so the consumer may wish to carry the different forms of payment in case the consumer does happen to make an unplanned visit.

This can lead to numerous methods of payments being carried by a consumer on a day-to-day basis. Additionally, a consumer may also need to carry other items regularly, such as drivers license, identification cards, loyalty program cards, and membership cards. When a consumer has to carry all of these items, they may also become disorganized and misplaced, causing security concerns, and possibly causing transactions to consume more time.

Additionally, various forms of wireless or contactless devices have been introduced for use in various types of transactions. For example, contactless transaction initiation is often performed with a "smart" card or other device, such as a key fob or a mobile device such as a cell phone or Personal Digital Assistant (PDA) containing a memory and a processor. Such a card or device typically also includes Radio-Frequency Identification ("RFID") or Near-Field Communications (NFC) components for contactless communication with a Point-Of-Sale (POS) device. The information stored in the memory of the device and communicated via the RFID or NFC components to the POS device is generally similar or identical to the information recorded on the magnetic stripe of a card, i.e., account number etc. Thus, in some cases, such devices may be utilized instead of more conventional cards.

Payment systems using NFC and RFID have been criticized for potential security flaws. To ensure greater security and/or to ease the mind of the consumer, various security features have been included with payment devices, such as wireless contactless devices. There are address verification services that check the address provided against the billing address with the credit card company. Even some credit cards have a card verification value (CVV) code imprinted on the back or front of the credit card that is not part of the credit card number (VISA™ refers to the code as CVV2, MasterCard™ calls it CVC2, and American Express™ calls it CID). These codes may be used to authenticate that the buyer has the proper CVV code, and tends to show the buyer physically has the card. Some wireless contactless devices may include biometric scanners and/or passwords as security measures. Other cards and payment devices require the user to select and use a personal identification number (PIN) to authenticate the user. However, compromise of PINs and/or loss of contactless payment devices may result in potential fraudulent uses and may be unsettling to potential consumers.

Purchases made over the Internet introduce unique fraud and security concerns, as a seller does not have the opportunity to physically identify a buyer and to ensure the buyer is entitled to use the financial account selected for payment. The Internet merchant often bears financial responsibility for fraudulent transactions. To help mitigate transaction fraud, payment systems have been introduced that require "two-factor authentication" for in-person purchases at the point-of-sale and for online purchases. Two-factor authentication systems require a buyer to submit two unique data elements associated with the financial account selected for payment (e.g., an account number and a personal identification number). Dynamically generated passwords provide a more effective second authentication factor than a static personal identification number (PIN) or other identifier.

There is a need in the art for improved methods and systems for utilizing mobile electronic devices in with increased security features for various types of financial transactions.

BRIEF SUMMARY

A financial transaction card is provided according to various embodiments described herein. The financial transaction card includes a card body with at least a front surface and a back surface. The financial transaction card may also include a near field communications transponder and/or a magnetic stripe, as well as a digital display configured to display alphanumeric characters on the front surface of the card body. The financial transaction card may also include a processor that is communicatively coupled with the near field communications transponder or magnetic stripe and the digital display. The processor may be configured to calculate one-time passwords and communicate the one-time passwords to both the near field communications transponder or magnetic stripe and the digital display.

In some embodiments, the one-time passwords calculated by the processor are a function of time and/or the expiration date. In some embodiments, the processor may communicate one-time passwords with a near field communications transponder or a magnetic stripe and/or the digital display. In some embodiments, the front surface of the card body includes a partial account number and the one-time passwords calculated by the processor is also a partial account number. The one-time password appended with the partial account number on the front surface of the card comprise a pseudo transaction account number. In some embodiments, the processor may be configured to calculate a dynamic card verification value and may be displayed on the display. The dynamic card verification value may be calculated as a function of time or the expiration date.

A method for providing a pseudo transaction account number is also provided according to another embodiment. The method calculates a first portion of the pseudo account number such that the first portion of the pseudo account number combined with a second portion of the account number comprises the account number. A dynamic card verification number is also calculated. The first portion of the pseudo account number and the dynamic card verification value are displayed on the card. In some embodiments, the first portion of the pseudo account number and the card verification value are displayed on the surface of a transaction card. In some embodiments, the account number is associated with a credit card account and the dynamic card verification number is calculated using a function based on an expiration date of the credit card account. In some embodiments, the dynamic card verification number is calculated using a function based on time. In other embodiments, the first portion of the pseudo account number is calculated using a function based on time. In yet other embodiments, the time is displayed on the card.

A system for providing passwords to a mobile device is disclosed according to one embodiment. Mobile devices using mobile wallets that include information for one or more financial accounts may use such passwords to authenticate the user of the financial account. Such mobile devices, for example, may include a near field communications (NFC) transponder or a radio frequency identification (RFID) transponder to communicate account information to a merchant at a point of sale device. passwords may be generated, for example, at a mobile wallet server, an acquirer system, a service provider system, and/or the mobile device itself. If the password is generated at a system other than the mobile device, the password may be communicated to the mobile device, for example, through a wireless carrier or service provider network. If the mobile device generated the password, then the mobile device may communicate the password to the acquirer system for authentication. The password may only be valid for a predetermined period. After the period of time expires, a new password may be generated and used by a user of the mobile device. The password may be randomly generated or generated by a function and may be time stamped.

When a transaction occurs, the mobile device may transmit the requisite account information including the password. The point of sale device may then request authentication from an acquirer system or another financial institution system. The acquirer system may have generated the password and, therefore, may simply compare the password received at the point of sale device with the password generated at the acquirer system. In other embodiments, the password may have been generated by a module, device or system other than the acquirer system. In such an embodiment, the acquirer system may receive the password automatically or may request the password associated with the account from the other module, device or system. The acquirer system may then compare the password received from the password generator and the password received from the point of sale device. If the passwords match, the mobile device is authenticated and the transaction moves forward.

In various embodiments the mobile device may be in communication with a service provider or wireless carrier. The mobile device may receive a password through the service provider or wireless carrier.

A wireless telephone is disclosed according to another embodiment. The wireless telephone may include a near field communications (NFC) transponder, a mobile wallet and an antenna. The mobile wallet may maintain information related to at least one financial account. The antenna may be communicably coupled to a wireless network. The wireless telephone is also configured to receive at least one password from a service provider; and communicate at least a portion of the account information in the mobile wallet including the password to a POS device through the NFC transponder. The wireless telephone may receive passwords at predetermined intervals and the passwords may be maintained by the mobile wallet. The wireless telephone may automatically receive passwords, for example, in response to a financial transaction or at set periods of time, or the wireless telephone may request the passwords.

A wireless telephone comprising a near field communications (NFC) transponder, a mobile wallet and a password generator is disclosed according to another embodiment. The mobile wallet maintains information related to at least one financial account and the password generator automatically generates a password for the at least on financial account at predetermined intervals. The mobile telephone is configured to communicate at least a portion of the account information in the mobile wallet including the password to a POS device through the NFC transponder. The password generator may generate a random password and may generate passwords at predetermined intervals, for example, between about 60 seconds and 7 days. The password may be communicated to an acquirer system through a service provider.

A wireless telephone comprising a near field communications (NFC) transponder, a mobile wallet, an antenna and a display is also disclosed according to another embodiment. The wireless telephone is configured to receive at least one password from a service provider and communicate at least a portion of the account information in the mobile wallet to a POS device through the NFC transponder. The wireless telephone may also display the password to a user. The user may manually enter the password displayed on the wireless telephone into the POS device via a keypad or other input mechanism. For Internet purchases, the user may manually enter the password displayed on the wireless telephone into the appropriate field on a website as part of entry of financial account information required for purchase.

A wireless telephone service provider system is also disclosed according to another embodiment. The wireless telephone service provider may include a mobile wallet network connection that is adapted to receive a password and a wireless telephone identifier from a mobile wallet server and a wireless telephone network connection that is adapted to communicate the password to a wireless telephone associated with the wireless telephone identifier.

A method for authenticating a password is also disclosed according to one embodiment. The method includes receiving a first password from a password generator and at some point receiving a second password from a point of sale device. The second password is received in order to authenticate the user of a mobile wallet. The method then compares the first password with the second password. If the passwords match a positive authentication message is sent to the point of sale device, otherwise a negative authentication message may be sent to the point of sale device.

Another method for authenticating a password is disclosed according to one embodiment. The method may include generating a first password and storing the first password in association with a mobile device identifier and an account number. The first password may then be transmitted to a mobile device. A second password may be received at some point from a point of sale device. The second password may be associated with an account number. The method may then receive the first password using the account number, compare the first password and the second password and then send authentication approval or rejection based on whether the passwords match.

Yet another method for using a password in a transaction is disclosed according to another embodiment. The method may include maintaining account information for at least one financial account at a mobile device. The method may include receiving a password from a service provider and associating the password with the at least one financial account. At least a portion of the account information for the at least one financial account and the password may be sent to a point of sale device as part of a financial transaction.

DETAILED DESCRIPTION

Figure 1:
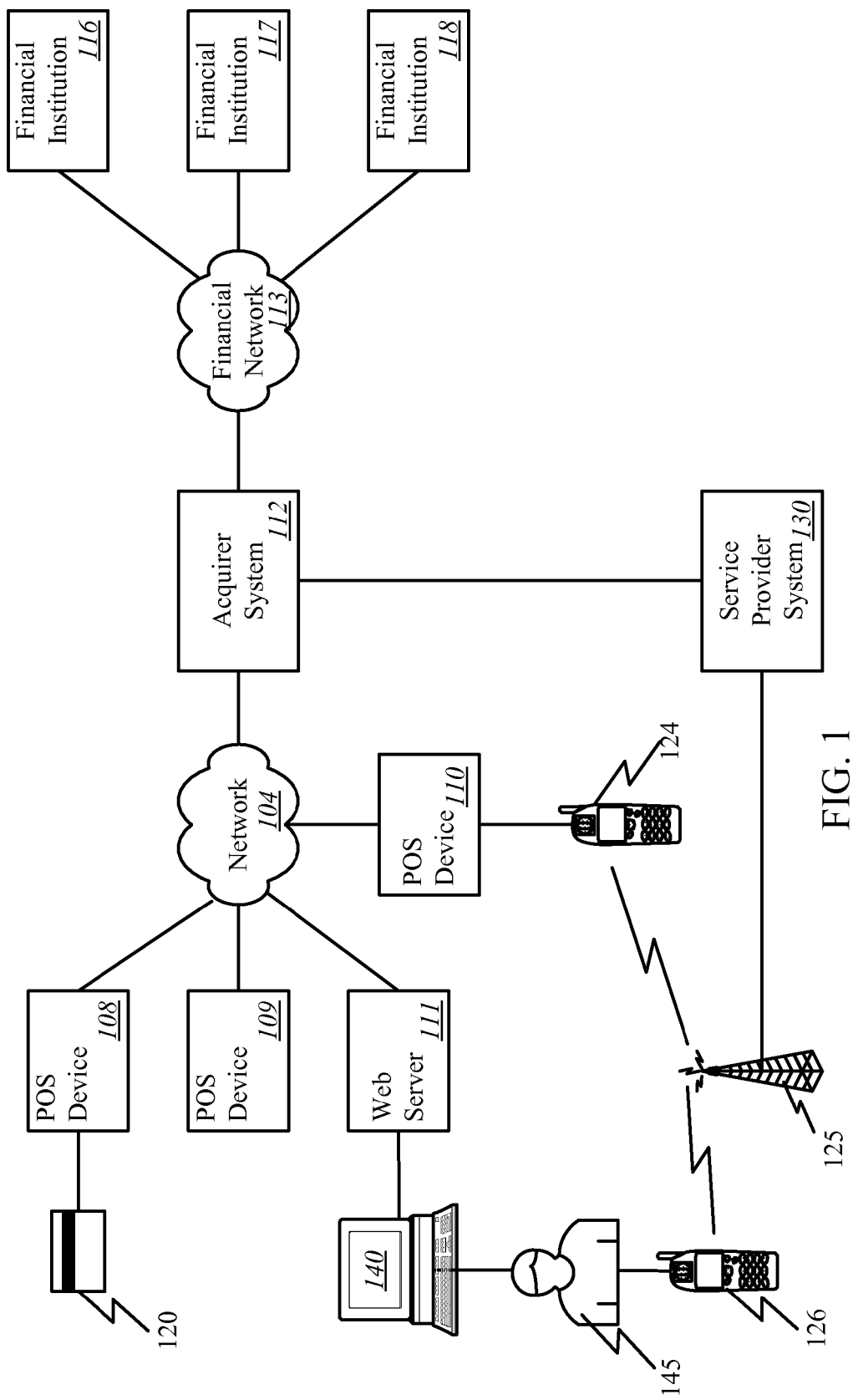
FIG. 1 is block diagram illustrating, at a high level, a system for processing transactions utilizing a mobile electronic device according to one embodiment.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form.

The description herein sometimes refers to "clients" and to "customers." Reference to "clients" is intended to refer to persons, i.e. individuals, entities, or their agents, on whose behalf a set of information is managed. Reference to "customers" or "consumer" is intended to refer to persons, i.e. individuals, entities, or their agents, who are the subject of or related to that information. Thus, merely for purposes of illustration, in the case where the information comprises credit-card account records for a credit card issued to Mr. Jones by Bank A, Bank A corresponds to a client and Mr. Jones corresponds to a customer or consumer.

In describing embodiments disclosed herein, reference is sometimes made to other terms having specific intended meanings. For example, as used herein, the term "carrier" refers to a provider of a network and/or service for use by a mobile device. For example, a carrier can include, but is not limited to, a provider of a cellular or other wireless communications service for use by a mobile device. The terms "carrier" and "service provider" are used interchangeably herein and are intended to be synonymous.

An "electronic receipt" refers to a receipt for payment of goods or services that can be created for and relate to one or more transactions. An electronic receipt can include information related to the transaction(s) and may be electronically transferred to the user's mobile device. According to one embodiment, electronic receipts can be stored in a mobile wallet of the mobile device.

The term "mobile device" is used herein to refer to any small, likely handheld, electronic device that can be used to initiate or otherwise participate in a financial transaction. For example, a mobile device can include, but is not limited to a cellular telephone, a Personal Digital Assistant (PDA), wireless telephone, a smart card or other contactless device, etc. Exemplary devices that may be adapted for use as mobile devices in various embodiments are described in co-pending and commonly assigned U.S. patent application Ser. No. 11/672,417, filed on Feb. 7, 2007, entitled "Contactless Electronic Wallet Payment Device"; U.S. patent application Ser. No. 11/551,063, filed on Oct. 19, 2006, entitled "Presentation Instrument With Non-Financial Functionality"; and U.S. Provisional Patent Application No. 60/833,022, filed on Jul. 24, 2006, entitled "Mobile Payment Device With Magnetic Stripe," each of which is incorporated herein by reference in its entirety for all purposes.

A "mobile wallet" refers to a software application that can reside on and/or be executed by a mobile device. According to one embodiment, the mobile wallet can be adapted to store payment vehicle information. In some cases, the mobile wallet can allow storage of multiple payment vehicles and can provide a user interface that can be used to select a specific payment vehicle. Additionally, the mobile wallet can be adapted to provide security to deter fraudulent and unauthorized use of the payment vehicles. As used herein, the terms mobile device and contactless device are intended to be synonymous.

"Near Field Communication" (NFC) refers to short range (20 cm or less) wireless technology used to facilitate communication between electronic devices in close proximity. For example, embodiments of the present disclosure provide for the use of NFC and/or other relatively short range communications between a mobile device and a POS device such as when a user of the mobile device scans or waves the mobile device in front of or near the POS device when paying for goods or services. In some embodiments, radio-frequency identification (RFID) technology may be used in place of NFC to facilitate communication between a POS and electronic devices.

A "payment network" refers herein to an infrastructure that supports that exchange of data in implementing payment transactions. It is anticipated that the data exchange typically proceeds between merchants and financial institutions. Examples of existing commercial networks that are included within the definition of "payment network" include the STAR/MAC network, the NYCE® network, the VISA® network, and the MasterCard® network. Access to a network by a consumer can be achieved through entry of a secret code, such as a personal identification number ("PIN"), in combination with data extracted from the mobile device. In some embodiments, a signature of the consumer may be used in lieu of a secret code. In some instances, particularly in support of transactions having a low value, a consumer might be permitted access to the payment network with only information extracted from the mobile device, without the need to provide a PIN or signature.

The term "payment vehicle" is used herein to refer to a method of payment. For example, payment vehicles can include, but are not limited to credit, debit, stored-value, and other types of accounts. In some embodiments, a payment vehicle can include loyalty points or other value accumulated, for example, under a loyalty program.

A "point-of-sale device" or "POS device" refers herein to any physical device situated at a location where a consumer may provide payment in support of a transaction. Such physical locations are typically merchant locations, such as where the POS device is operated by a clerk or is available for self-operation by the consumers, but may also be in other locations. For instance, certain automatic teller machines "ATMs" may be equipped to support transactions for the sale of movie or sporting-event tickets even remote from the merchant location; other similar types of transactions that may be performed with a POS device at a location remote from the merchant will also be evident to those of skill in the art. In some cases, a personal computer equipped with the appropriate structure may be used as a POS device even when located on the consumer premises. Examples of POS devices thus include, without limitation, personal computers, cash registers, and any devices capable of reading a magnetic stripe, an RFID chip, NFC communications, or other information from a mobile device, contactless device, card, etc. Exemplary devices that may be adapted for use in various embodiments of the present disclosure are described in the following commonly assigned applications and patents, the entire disclosures of which are incorporated herein by reference for all purposes: U.S. Provisional Patent Application No. 60/147,889, filed Aug. 9, 1999, entitled "Integrated Point Of Sale Device"; U.S. Pat. No. 6,547,132, issued Apr. 15, 2003, entitled "Point Of Sale Payment Terminal"; U.S. patent application Ser. No. 10/116,689, filed Apr. 3, 2002, entitled "Systems And Methods For Performing Transactions At A Point-Of-Sale"; U.S. Pat. No. 6,886,742, issued May 3, 2005, entitled "Systems And Methods For Deploying A Point-Of-Sale System"; U.S. Pat. No. 6,827,260, issued Dec. 7, 2004, entitled "Systems And Methods For Utilizing A Point-Of-Sale System"; and U.S. Pat. No. 7,086,584, issued Aug. 8, 2006, entitled "Systems And Methods For Configuring A Point-Of-Sale System."

A "POS processing system" refers to a computational system used by merchants to control communications between POS devices and payment networks. Such systems may be run internally by merchants, may be run by merchant consortia, or may be outsourced to service providers in different embodiments. Some exemplary POS processing systems which may be adapted to operate with embodiments of the present disclosure are described in commonly assigned U.S. Pat. Nos. 6,886,742, 6,827,260 and 7,086,584, the complete disclosures of which are herein incorporated by reference.

A "primary account number" or "PAN" refers to a number assigned to an account. The PAN is generally assigned by a financial institution maintaining the account. In most embodiments, it is anticipated that the PAN will identify an account associated with the wireless device and be included as data stored by the memory of the wireless device. Identification of the PAN permits a financial institution that maintains the account to make a unique identification of the consumer initiating a payment or other transaction and determine which of potentially several accounts is to be used in supporting the transaction.

The terms "real time" or "near real time" are used herein to refer to a process or action that occurs within a relatively short time. Importantly, the terms real time and near real time are not intended to imply an immediate or instantaneous result or action. Rather, the terms are used to refer to process or actions that can be performed relatively quickly, such as within several seconds or minutes.

The term "user" refers to an entity, typically a person, that is associated with a particular mobile device. Typically, the user is the person that owns, uses, or leases the mobile device and/or controls the content and use of the payment vehicles maintained within the mobile wallet of the device.

A wireless mobile device including a mobile wallet that provides a password for transactions is disclosed according to one embodiment. The wireless device may generate the passwords internally according to a password generation mechanism that may then be confirmed through an acquirer server and/or a mobile wallet server that also includes a similar password generation mechanism. Each of the password generation mechanisms may be in sync with each other through a wireless network or may be programmed to produce the same password at the same time. In other embodiments, the wireless device may periodically receive passwords from a mobile wallet server through a carrier or service provider.

FIG. 1 is block diagram illustrating, at a high level, a system for processing transactions utilizing a mobile electronic device according to one embodiment. Traditionally, a credit card may be issued to a customer by a financial institution, such as a bank and typically displays a logo for an association that implements rules that govern aspects of use of the card. Account information is usually printed on the face of the card, specifying an account number and name of an authorized holder of the card; this information is also stored together with additional information on a magnetic stripe that is usually affixed to the back of the card. When the cardholder wishes to execute a transaction, such as a financial transaction for the purchase of goods and/or services, he presents the card 120 to a clerk at a merchant location, who swipes the card through a magnetic-stripe reader comprised by a point-of-sale device 108. Multiple point-of-sale devices 108-110 may have been provided at a variety of locations by an acquirer, who acts as an intermediary between merchants and the issuer financial institutions. As an intermediary, the acquirer coordinates transaction routing and performs a variety of backend processes.

A wireless device 124 may be used to execute a transaction at a POS 110. A wireless device 124 may include a near field communication (NFC) transponder and a mobile wallet. The wireless device 124 can be adapted to maintain information related to at least a financial account in the mobile wallet. The NFC transponder can communicate at least a subset of the information related to the financial account upon initiation of a transaction. This information may include a personal account number (PAN), expiration date, and/or a password or personal identification number (PIN). In some cases, the mobile wallet of the mobile device can maintain information related to a plurality of financial accounts such as, for example, debit accounts, credit card accounts, demand deposit accounts, stored value accounts, loyalty accounts under a customer loyalty program, etc.

The point-of-sale device 108 typically initiates a connection to an acquirer system 112 through a network 104, such as the Internet or another network as described above. A packet of information that includes information read from the magnetic stripe of the card 120 or received from the NFC transponder on a wireless device 124, including a merchant identifier, the date, transaction amount, and a password or PIN are forwarded by the point-of-sale device 108 through the network 104 to the acquirer system 112. The acquirer system 112 may store some of the information and sends an authorization request, via financial network 113, to the issuing financial institution 116, 117 or 118 which may be identified from a portion of the account number read from the magnetic stripe. The transaction is authorized or denied depending on such factors as the validity of the cardholder name, the validity of the card number, the level of available credit in comparison with the transaction amount, and the like. If authorized, an authorization code is routed back through the acquirer system 112, which captures additional information and forwards the authorization code back to the originating point-of-sale device 108 so that the transaction may be completed. Periodically, such as at the end of every day, the transactions are settled by the acquirer initiating funds transfers that fund merchant bank accounts with total transaction amounts that may have resulted from multiple transactions by multiple customers.

Other types of accounts may operate with similar structures, although the details for each type of account are different. For example, use of a debit account typically requires that the customer provide a personal identification number ("PIN"), which must be validated before any authorization for the transaction can be provided. Authorization usually depends on the current level of funds actually in the identified account rather than on a credit level, and funds transfer is usually executed substantially contemporaneously with providing the authorization rather than performing periodic settlement. Other types of accounts may use arrangements that have similar differences in their particulars. In such cases, the PIN may be a password that is sent from at the wireless device 124 or received at the wireless device 124 from a service provider 130 through a relay station 125.

According to one embodiment and as will be discussed in greater detail below, the mobile device 124 can store and/or execute a mobile wallet application adapted to maintain account numbers and other information related to one or more financial accounts such as credit accounts, debit accounts, demand deposit accounts, stored value accounts, etc. maintained by one or more financial institutions 116, 117, 118. The mobile device 124, for example via the mobile wallet application, may allow the user to review accounts that are stored in the mobile device 124 and select an account for a particular transaction such as a purchase. Upon selection of an account for use in the transaction, the user of the mobile device can scan or swipe the device 124 in front of or near the POS device 110 causing the selected account information to be read from the mobile device 124 via the NFC connection.

The information regarding the selected can identify the account to be used in supporting transactions, for example, including an indication of the financial institution 116 where that account is maintained, an account number, etc. Such identifications may conveniently be made with numerical strings similar to card numbers that have portions that identify a financial institution and portions that identify specific accounts. Additional information may include ownership details of the account, current balance levels for the account, and the like.

The point-of-sale device 108 typically initiates a connection to an acquirer system 112 through a network 104 such as the Internet or another network as described above. A packet of information that may include, for example, information read from the mobile device 124, a merchant identifier, the date, a password or PIN and transaction amount may be forwarded by the point-of-sale device 110 through the network 104 to the acquirer system 112. The acquirer system 112 may store some of the information and authenticate the password received from the mobile device 124. The acquirer may also send an authorization request, via financial network 113, to the issuing financial institution 118, which may be identified from a portion of the account number read from the mobile device 124. The transaction is authorized or denied depending on such factors as the validity of the account holder name, the validity of the account number, the level of available credit in comparison with the transaction amount, and the like. If authorized, an authorization code is routed back through the acquirer system 112, which captures additional information and forwards the authorization code back to the originating point-of-sale device 110 so that the transaction may be completed.

A web server 111 may also be coupled with the network 104. For example, the merchant may be an online merchant, which provides a webpage with from which consumers may purchase goods and/or services. A user 145 may access the webpage hosted on the web server 111 through the user's computer 140 or any other computer system over, for example, the Internet. The user 145 may receive a password from the service provider system 130 on their mobile device 126. The user may use this password to authenticate themselves to make a purchase at the webpage using a credit card or other payment vehicle. The web server 111 may send the password and credit card information through the network 104 to the financial network 113 and/or a financial institution 116, 117, 118 for approval.

Figure 2A:
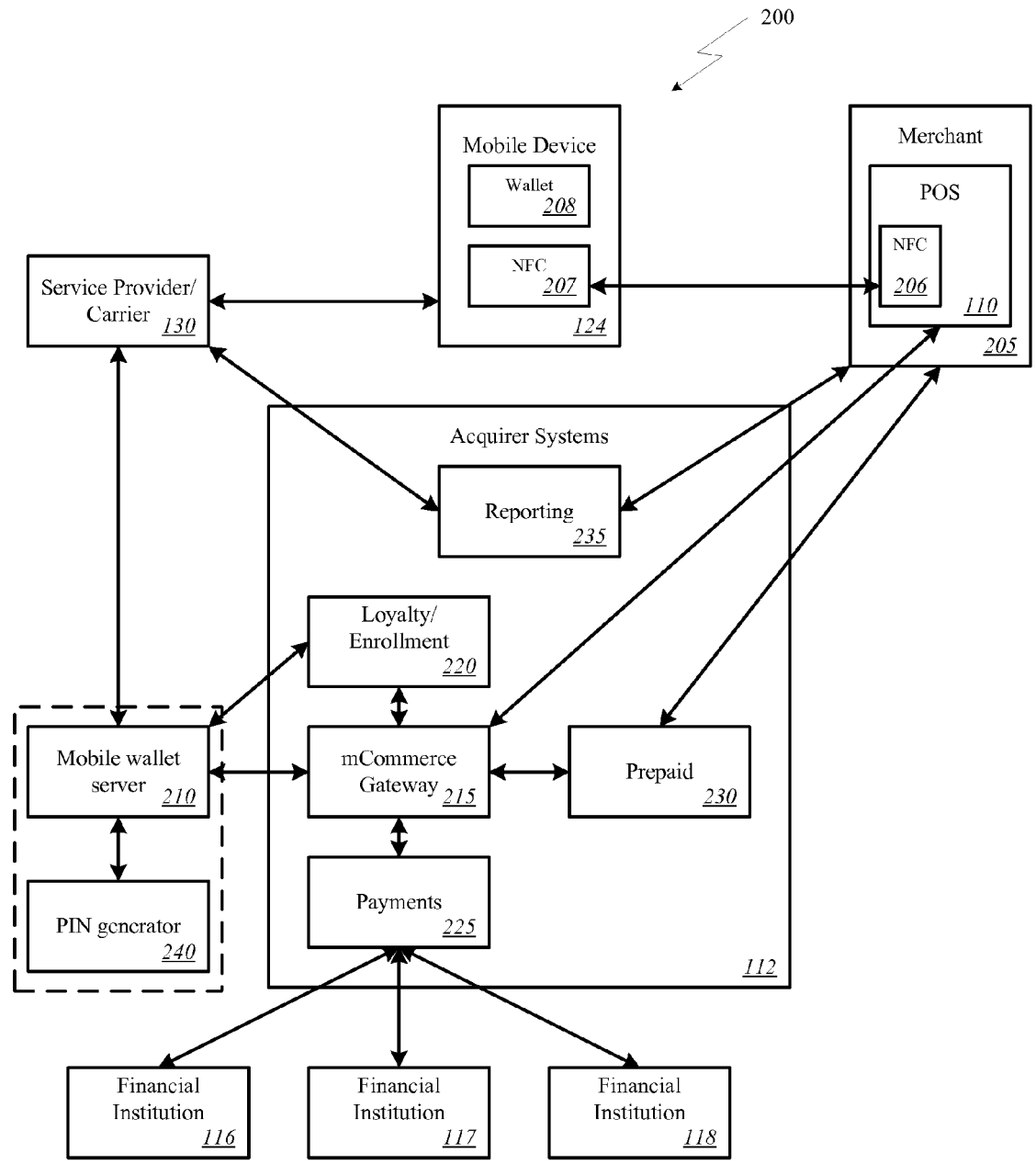
FIG. 2A is a block diagram illustrating additional details of the system of FIG. 1 according to one embodiment.

FIG. 2A is a block diagram illustrating additional details of the system of FIG. 1 according to one embodiment. In this example, the system 200 includes a mobile device 124 such as described above. The mobile device can include a NFC transponder 207 and a mobile wallet 208. The mobile device 124 can be adapted to maintain information related to at least one financial account in the mobile wallet 208 and communicate at least a subset of the information related to the financial account via the NFC transponder 207 upon initiation of a transaction. In some cases, the mobile wallet 208 of the mobile device 124 can maintain information related to a plurality of financial accounts such as, for example, debit accounts, credit card accounts, demand deposit accounts, stored value accounts, loyalty accounts under a customer loyalty program, etc. In such cases, the mobile wallet 208 of the mobile device 124 can be adapted to present the plurality of financial accounts to a user of the mobile device 124 and receive a selection of a financial account for the transaction. The mobile device 124 can also be adapted to communicate at least a subset of the information related to the selected financial account via the NFC transponder 207 upon initiation of the transaction.

For example, the user of the mobile device 124 can scroll or otherwise navigate a user interface of the device 124 to select an account for which information is stored in the mobile wallet 208. The information can include, for example, an account number, and account name, an account type, a bank name, and/or other information such as, for example, may be typically encoded on a magnetic stripe of a card. Once selected, the user can then use the account to perform a transaction such as making a purchase, transferring an account balance, looking up an account balance, viewing a transaction history, etc. In the case where the user is making a purchase, from a merchant 205, the user can use the selected account to pay for the purchase by swiping or passing the mobile device 124 in front of or near an NFC equipped point of sale device 110 provided by the merchant 205.

The point of sale device 110 can also include an NFC transponder 206. The point of sale device 110 can be adapted to receive the information related to the financial account from the mobile device 124 via the NFC transponder 206 and send a communication related to the transaction that includes the information related to the financial account. For example, in the case of a consumer making a purchase using a credit, debit, stored value, or other account, the request can be a request to authorize the transaction.

A mobile commerce gateway 215 can be adapted to receive the communication related to the transaction from the point of sale device 110 of the merchant system 205 and route the communication for handling of the transaction based on the information related to the financial account. That is, the acquirer systems 112 can include a plurality of systems 215-235 systems adapted to perform functions related to various types of financial transaction. For example, the acquirer systems 112 can include, but are not limited to a payments system 225 adapted to communicate with financial institutions 116-118 maintaining the financial account and authorize the transaction based on the communication with the financial institution as described above. The acquirer systems 112 can also include a loyalty/enrollment system 220 adapted to enroll the mobile device 124 for use with the system 200. A loyalty/enrollment system 220 can be adapted to maintain a loyalty account under a customer loyalty program. A stored value system and/or prepaid system 230 adapted to maintain a stored value account. The mobile commerce gateway 215 can be adapted to route communications to the plurality of acquirer systems 112 based at least in part on a transaction type.

The system 200 can also include a service provider system 130 communicatively coupled with the mobile device 124, for example, via a cellular or other network. A mobile wallet server 210 can be communicatively coupled with the service provider system 130 and the mobile commerce gateway 215. The mobile wallet server 210 may communicate with a PIN generator 240. The PIN generator 240 may produce passwords, PINs and/or pass-codes. The PIN generator 240 may be coupled with or included with the mobile wallet server 210. The mobile wallet server 210 can be adapted to interact with the mobile wallet 208 of the mobile device 124 via the service provider system 130.

For example, the mobile wallet server 210 can interact with the mobile wallet 208 of the mobile device 124 to provide functions related to maintenance of the mobile wallet 208. In another example, the mobile wallet server can interact with the mobile wallet of the mobile device to provide functions related to maintenance of the information related to the financial account. The mobile wallet server 210 may communicate passwords to the mobile device 124. In other words, functions that can be performed by the mobile wallet server 210 through the service provider system 130, for example over the cellular or other network, can include, but are not limited to downloading and installing the mobile wallet application, updating balance information for the accounts stored therein, performing various transfers between those accounts, viewing transaction histories for the accounts, providing marketing messages, e.g., coupons and advertisements, transmitting passwords, redeeming coupons, etc.

The mobile wallet server 210 and/or the acquirer system 112 may maintain a database associating, at least, financial accounts, passwords, and mobile devices. For example, an account number may be associated with a password and a mobile wallet identifier or a mobile device identifier, such as, for example, a mobile device telephone number and/or a mobile device identifier. The mobile wallet server 210 may update the password associated with an account as the password changes over time. Moreover, a mobile wallet may comprise more than one account. Accordingly, each account may be associated with a unique password or each mobile device may use the same password for each of the various accounts within the mobile wallet. In some embodiments, for example, the mobile wallet server 210 may associate a password with a plurality of financial accounts held within a single mobile wallet. The information may also be organized based on the mobile wallet rather than the account number. Various other data storage schemes may also be used to coordinate mobile devices, accounts and passwords.

The PIN generator 240 may be located as shown as part of the mobile wallet server 210. In other embodiments, the password generator may be part of the service provider 130. As such the service provider 130 communicates passwords to both the mobile device 124 and the acquirer system 112. In another embodiment, acquirer system 112 includes the PIN generator 220. Accordingly, the acquirer system 112 may communicate passwords to the mobile device 124 through the service provider 130. Moreover, the mobile device 124 may also include a password generator 210 and communicate a password(s) to the acquirer system 112 and/or the mobile wallet server 210 through the service provider 210. Furthermore, a third party server or system (not shown) may generate and provide passwords to both the acquirer system 112 and the mobile device 124. In such embodiments, the third party server may be coupled to the acquirer system through a network, such as the Internet, an Intranet, a wireless telephone network, etc.

In some cases, depending upon the functions to be performed, the mobile wallet server 210 may make requests to the mobile commerce gateway 215. For example, in the case of determining a balance for a credit account, the mobile wallet server 210 may make a request to the mobile commerce gateway 215. Such a request can be routed by the mobile commerce gateway 215 to a payments system 112 or other acquirer system 112 which in turn makes a request to an issuing financial institution 116. Moreover, the mobile wallet server 210 may communicate the passwords to the mobile commerce gateway 215. The mobile commerce gateway 215 may then compare and approve a password received from the POS 110 as part of a transaction and a password sent to the mobile device associated with the transaction by the mobile wallet server 210. Such comparison and approval may be used to approve a transaction prior to processing. In other embodiment, the mobile wallet server 210 may perform the comparison and approval of passwords.

The PIN generator 240 may automatically generate a new password for a specific account at a specific mobile device 124. These passwords may be generated at predetermined intervals and transmitted to the mobile device 124 through the service provider 130. In certain embodiments, the PIN generator 240 comprises a random number generator or other suitable secure ID token known in the art of virtual private networks. By way of non-limiting example, the PIN generator 240 may automatically generate a new password at a predetermined interval between about 60 seconds and seven days, e.g., about every 60 seconds, 2 minutes, 5 minutes, 10 minutes, 15 minutes, 30 minutes, 1 hour, 12 hours, 24 hours, 2 days, 5 days, etc. The predetermined interval may be dynamically adjusted based on the network latency. For example, the network provider 130 may determine or estimate the network latency or the time required to receive and send a password from the mobile wallet server 210 to a mobile device 124. The predetermined interval may be determined based on this latency. If latency is high, then the predetermined time interval may be automatically lengthened and vice versa. The mobile wallet server may communicate the duration of predetermined interval to the mobile device as well as control signals that may be used to determine network latency. A password may also be time stamped and/or include a time signature that may be used to determine when and/or whether the password expires.

The PIN generator 240 may also generate a password upon request from a mobile device 124 through the service provider 130. When a user of the mobile device 124 presents an account from the mobile wallet 208 through the NFC transponder 207 to POS 110 to settle a transaction, the user may request a password from the mobile wallet server 210 through the service provider 130. The mobile device 124 may then send the password to the POS 110 for authentication through the acquirer system 112.

Figure 2B:
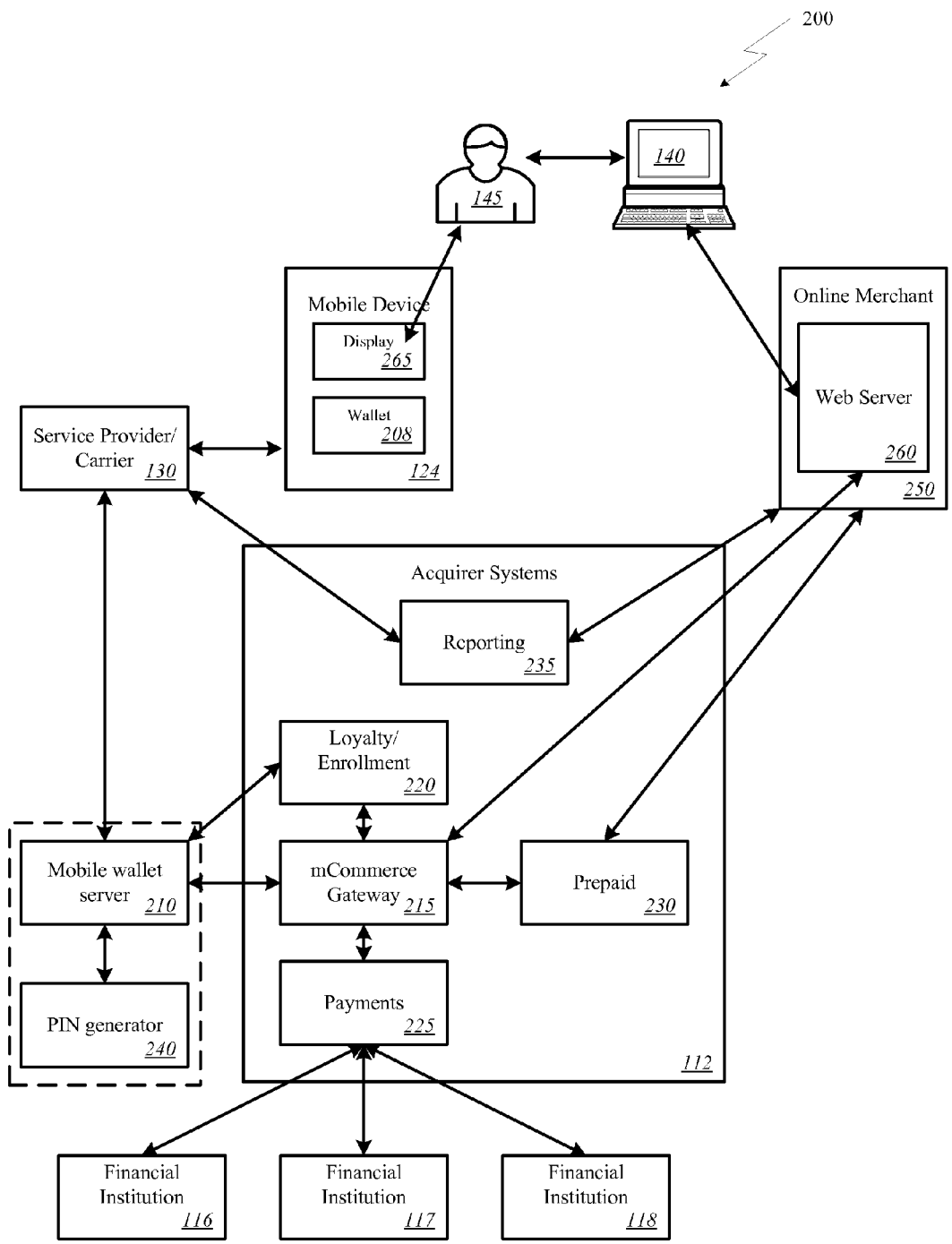
FIG. 2B is a block diagram illustrating additional details of the system of FIG. 1 including an online merchant according to one embodiment.

As shown in FIG. 2B, the merchant, in another embodiment, may be an online merchant 250. In such an embodiment, the merchant 250 may include a web server 260. The web server 260 may be in communication with the acquirer system 112 as discussed above for a POS device. The mobile device 124, in this embodiment may include a display 265 that may display passwords to a user 145. Accordingly, the user 145 may access the online merchant 250 through a user computer 140. At the point when payment is required, the user 145 may enter payment details including a password displayed on the display 265 of the mobile device 124.

Figure 3:
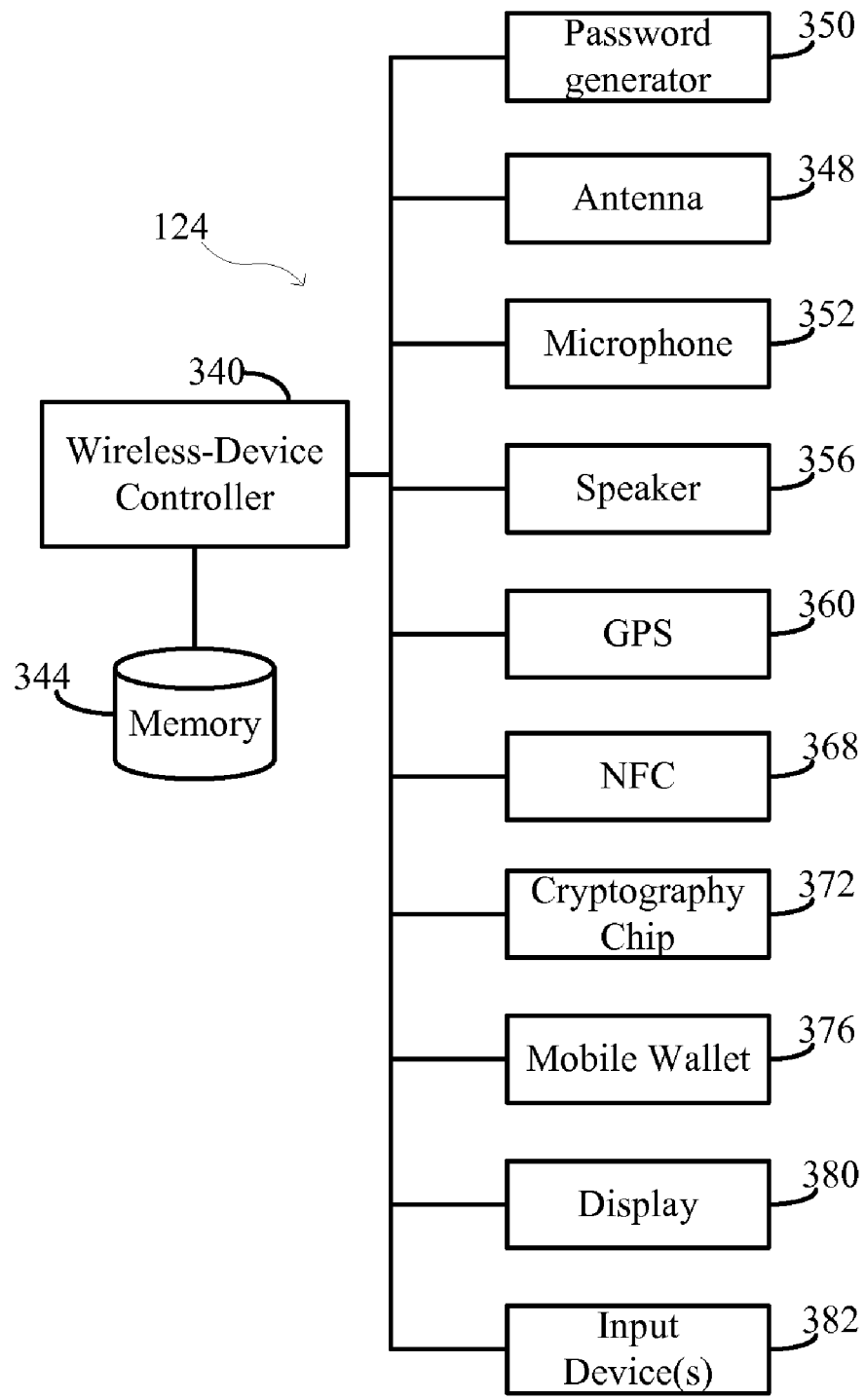
FIG. 3 is a block diagram illustrating components of an exemplary mobile device that may be used with various embodiments.

FIG. 3 is a block diagram illustrating components of an exemplary mobile device that may be used with various embodiments. The mobile device 124 includes a controller 340 which can comprise a microprocessor or other computing device executing software stored, for example, in memory 344 for coordinating the functions of a variety of components. Several of the components that may be controlled by the controller 340 include components used for standard functionality of the mobile device 124. For instance, in embodiments where the mobile device 124 is a cellular telephone, the controller may be interfaced with a microphone 352, a speaker 356, and an antenna 348. The microphone 352 and speaker 356 may be used to receive and amplify voice signals that are exchanged by users of the cellular telephone. The antenna 348 may be used to transmit and receive electromagnetic signals that correspond to encoded versions of the voice signals being exchanged.

Other components may include a global positioning system 360 that may be used to locate a position of the wireless device. Such a global positioning system 360 functions by transmitting an electromagnetic signal to an orbiting satellite that identifies a relative location of the source of the signal and correlates that relative position with a geographical map of a region of the Earth. An NFC module 368 may also be provided to encode and decode transmissions sent and received electromagnetically with the point of sale device as discussed above. Because transmissions involving the account information include sensitive financial data, such as account numbers, an cryptography module 372 may also be provided to allow encryption of data sent and received by the mobile device 124 via the NFC module 368.

According to one embodiment, the mobile device 124 can also include a mobile wallet module or application 376. The mobile wallet can be adapted to store payment vehicle information, i.e., account information for one or more financial accounts, such as credit accounts, debit accounts, demand deposit accounts, stored value accounts, etc. In some cases, the mobile wallet 376 can allow storage of multiple payment vehicles and can provide a user interface that can be displayed on a screen or display device 380 and through which the user can select a specific payment vehicle by manipulating a keypad, wheel, touch screen, or other input device 382. The mobile device 124, for example via the mobile wallet application 376, may allow the user to review accounts that are stored in the memory 344 of the mobile device 124 and select an account for a particular transaction such as a purchase. Upon selection of an account for use in the transaction, the user of the mobile device 124 can scan or swipe the device 124 in front of or near the POS device causing the selected account information to be read from the mobile device 124 via the NFC connection module 368.

Moreover, the display device 380 may display account information to a user. This account information may, for example, display an account number and/or a password. The user may wish to make a purchase over the Internet and may need to enter the account information or password through a web browser. This information may be read from the mobile device's 134 display device 380. The display device 380 and the input device 382 may be used to request and receive a password, PIN, biometric feature, etc., in order to gain access to information within the mobile wallet 376 and/or in order to transmit account information and/or passwords to a POS device 110.

According to another embodiment, the mobile device 124 may include a password generator 350. The password generator 350 may automatically generate a new password, passcode or PIN at predetermined intervals. In certain embodiments, the password generator 350 comprises a random number generator or other suitable secure ID token known in the art of virtual private networks. By way of non-limiting example, the password generator may automatically generate a new security PIN at a predetermined interval between about 60 seconds and seven days, e.g., about every 60 seconds, 2 minutes, 5 minutes, 10 minutes, 15 minutes, 30 minutes, 1 hour, 12 hours, 24 hours, 2 days, 5 days, etc. In certain embodiments, the password generator 350 may display a password on the display 380. The user may then enter the password at a POS device 110 if prompted. In other embodiments, the mobile device 124 may transmit the password to the POS device 110 through the NFC 368. Moreover, the generated password may be time coded. The password generator 350 may also be in sync with a password generator at the mobile wallet server. Having the two generators in sync permits authorization of the password received at the POS device 110 from a mobile device 124 using the password at the mobile wallet server.

Figure 4:
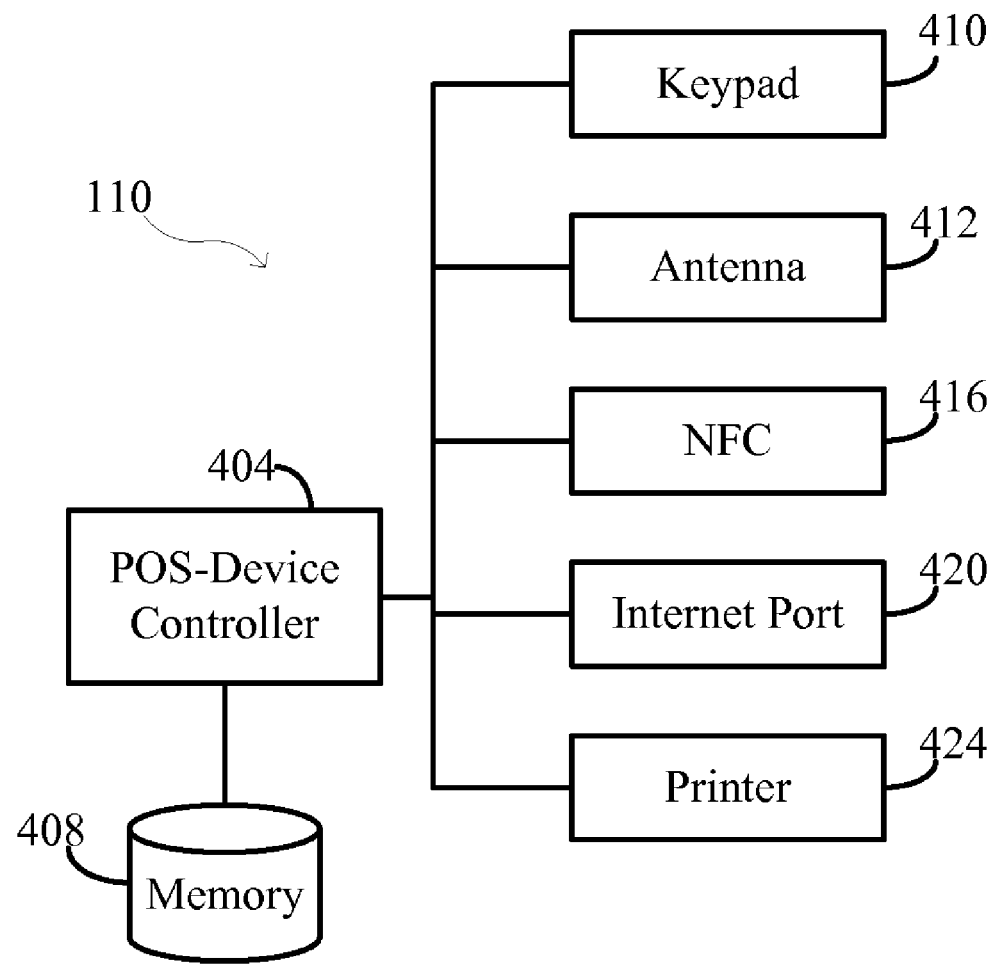
FIG. 4 is a block diagram illustrating components of an exemplary point of sale device 110 that may be used with various embodiments.

FIG. 4 is a block diagram illustrating components of an exemplary point of sale device 110 that may be used with various embodiments. Operations performed by the point-of-sale device 110 are generally coordinated by a controller 404, which is provided in electrical communication with a number of components. For example, the controller 404 can comprise a microprocessor or other computing device executing software stored, for example, in memory 408. Components with which the controller 404 is coupled can include a keypad 410 for manually entering information, such as account numbers, dollar amounts, passwords, etc.; an antenna 412 for transmitting and receiving electromagnetic signals; and an NFC module 416 that provides instructions for implementing a communications protocol, such as an NFC protocol. The NFC module 416 performs a more active role than the antenna 412, determining what electromagnetic signals to transmit over the antenna 412 and/or interpreting electromagnetic signals that are received by the antenna 412. A port may be provided to permit the exchange of wired communications with the point-of-sale device 404, one example of the port being a TCP/IP port 420 that enables the point-of-sale device 404 to engage in Internet communications. A printer 424 interfaced with the controller 404 permits receipts and other documents to be printed by the point-of-sale device 404.

Figure 5:
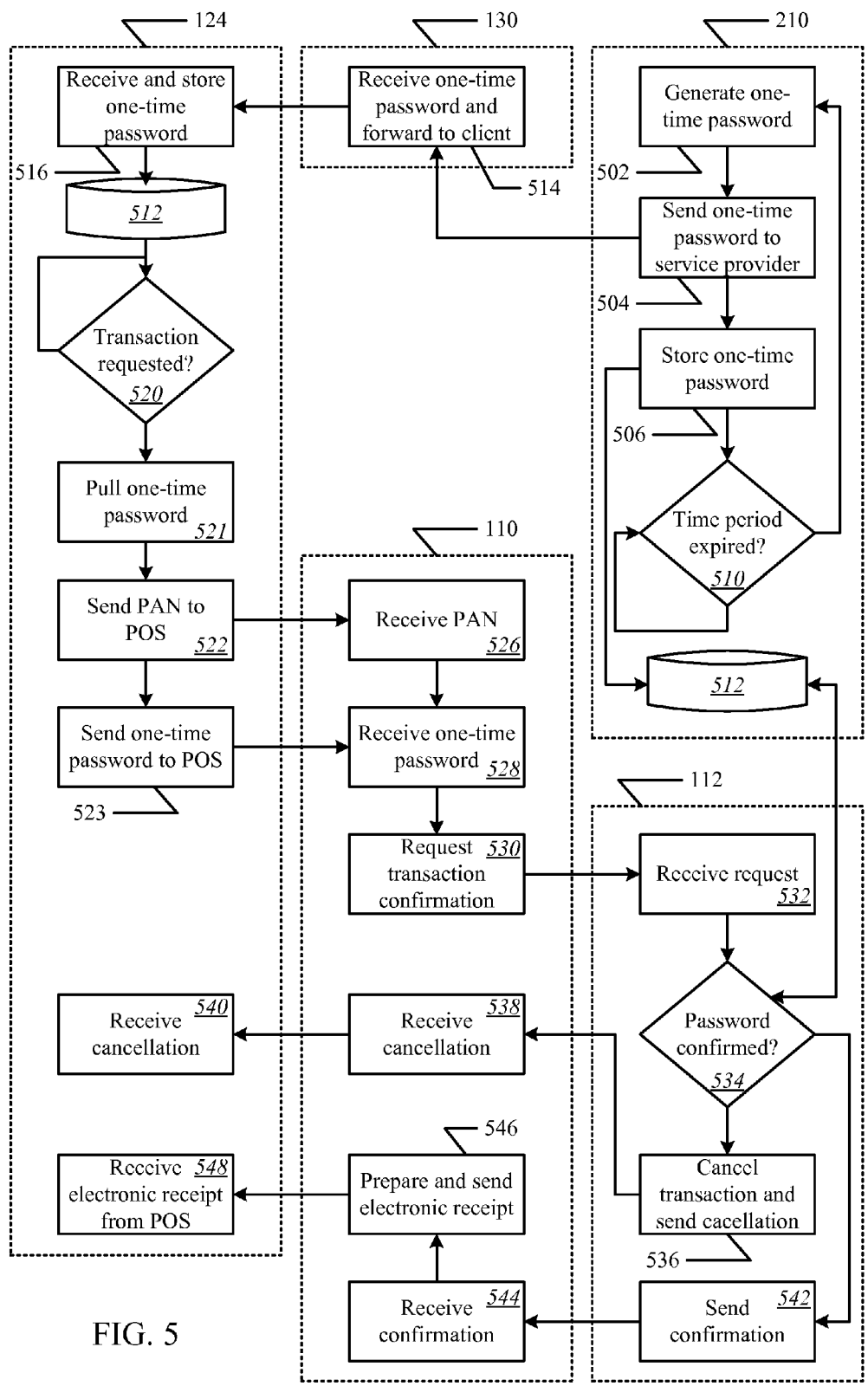
FIG. 5 is a flowchart showing a method for using passwords according to one embodiment.

FIG. 5 is a flowchart showing various embodiments. Various steps, sub-processes, decisions, etc. of the process occur at various components. The components are outlined with dotted lines. A mobile device 124, a service provider 130, a mobile wallet server 210, a POS device 110 and an acquirer system are shown. The steps shown may occur in any order and any number of sub-steps may occur to complete a single step. Moreover, other steps, not shown, may be used as well. Also, various steps may occur within the component shown or in another component either shown or not shown.

According to the embodiment shown in FIG. 5, at block 502 a password is generated at the mobile wallet server 210, sent to the service provider 130 at block 504 and stored in memory 512 at block 506. The mobile wallet may also associate a PAN, phone number, email address, or an identification number with the password prior to sending the password to the service provider 130. The service provided may use the PAN, phone number, email address, or an identification number to identify where and how to send the password to the proper mobile device. The mobile wallet then waits a predetermined period of time at block 510. If time has not expired the process loops until time expires. Once the time period expires, the mobile wallet server generates a new password and repeats the process. The mobile wallet server 210 may generate passwords for a number of different users, mobile wallets, mobile devices 124, and/or accounts within a mobile wallet. Accordingly, multiple password generators may be used.

The service provider 130 receives the password from the mobile wallet server 210 at block 514, and forwards the password to a mobile device 124. The service provider may identify the mobile device based on a PAN, phone number, email address, or an identification number associated with the password received from the mobile wallet server 210. The mobile wallet may also send the password to the acquirer system 112 at the same time the password is sent to the mobile device 124. In another embodiment, the mobile wallet server 210 may only send a password to the acquirer system when requested by the acquirer system 112.

In another embodiment, the mobile wallet server 210 may produce passwords in response to a request from a mobile device 124. This request may be made, for example, when a user approaches a POS device 110 and initiates a transaction. In response to such a request, the mobile wallet 210 may generate, store and transmit a password to the mobile device 124 through the service provider 130. In any embodiment, the password may only be valid for a set period of time and may be stored at the mobile wallet server with an expiration indicator or a time stamp.

The mobile device 124, receives a password from the service provider 130 at block 516 and stores the password in memory 512. Meanwhile, the mobile device waits until a transaction is initiated or requested at block 520. A transaction may be initiated by a user in a number of different ways. For example, the user may access the mobile wallet through the mobile device 124 and chose to use an account to settle a transaction. If a transaction is requested, the account information related to the selected account is retrieved from memory along with the password at block 521. At blocks 522 and 523 at least the PAN and the password is transmitted to a POS device 110 through, for example, a NFC transponder. The password may alternatively be displayed to a user on the display of the mobile device and then may be transmitted to the POS device 110 by the user, for example, through a keypad. Other information about the account may also be transmitted to the POS device 110, such as, for example, expiration date, name of the account holder, transaction amount limitations, issuing financial institution information, network routing information, etc.

The POS device 110 may receive the PAN and the password from the mobile device 124 at blocks 526 and 528. The PAN and password may be transmitted and received through NFC transponders. In other embodiments, the PAN is transmitted through NFC transponders while the password is received through a keypad or touch screen. As part of settling the transaction the POS device may require authentication or confirmation of the transaction. POS devices, in general, communicate with acquirer systems 112 in order to authenticate and approve transactions based on account information.

The POS device may request authentication of the user from the acquirer by requesting authentication from the acquirer system 112 at block 530. The authentication request may include the PAN and the password. The authentication request may also include other transaction details, such as, for example, transaction amount, transaction time, account holder name, issuer name or id, etc. The acquirer system 112 may receive the request at block 532 and then authenticate the user by comparing the password received from the user and/or mobile device 124 through the POS device 110 with the password stored at the mobile wallet server 210 at block 534. If the passwords does not match, the transaction is canceled at block 536; the POS device 110 is notified at block 538 and the mobile device 134 is notified at block 540. If the passwords do match at block 534, a confirmation may be sent to the POS device 110 at block 542 and received at the POS device 110 at block 544. The acquirer system 112, may also approve the transaction through a financial institution based on the available funds, credit or stored value. Such approval may run in parallel or serially with the password authentication. If the transaction is completed through the acquirer system, the POS device 110 may prepare and send an electronic receipt to the mobile device at block 546 that is received by the mobile device at block 548.

Figure 6:
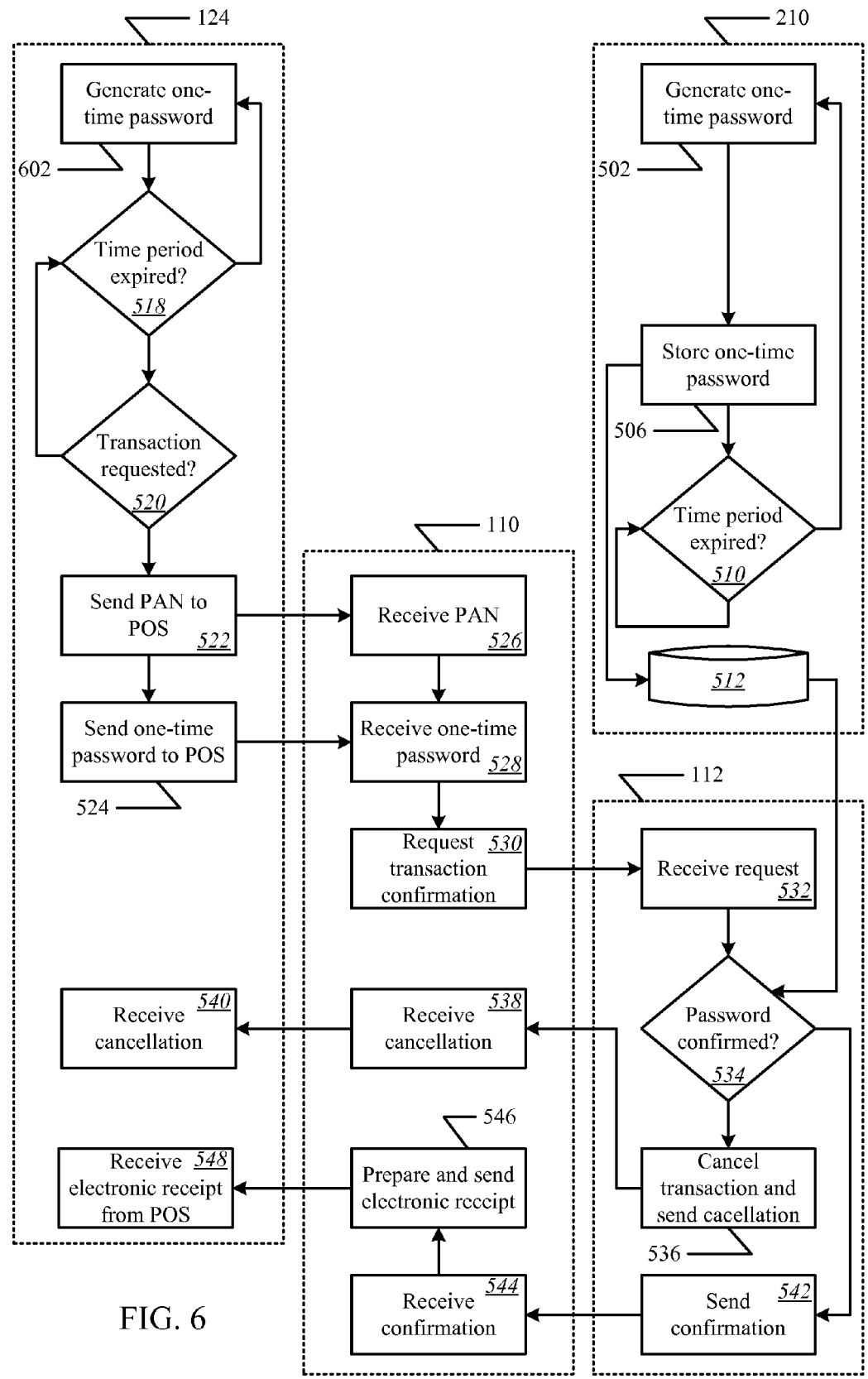
FIG. 6 is a flowchart showing another method for using passwords according to one embodiment.

FIG. 6 shows another flowchart of another embodiment. In this embodiment, the mobile device include a password generator as shown in FIG. 4. The password generator may be in sync with a password generator used at the mobile wallet server. For instance, the password generators may generate passwords that are a chaotic or hash function of the time. For example, both password generators may produce the same password at substantially the same period of time. Through the service provider, the two password generators may sync internal clocks in order to simultaneously produce the same passwords.

The mobile wallet server 210 generates passwords at block 502 that are stored at block 506 in a memory or storage location 512. The password generator may generate a second password when a set time period has expired at bock 510. Likewise, the password generator at the mobile device 124, may also generate passwords at block 602. The password generator may continue generating passwords until a set time period has expired at block 518. These passwords may be saved in memory or if not used, simply ignored. In another example, each new password is stored and if needed for a transaction, transmitted to a POS device 110, otherwise the mobile device 124 may replace the password in the same memory location. In yet another embodiment, the password generator may store the password or passwords s and deliver them to the mobile device 124 when requested.

At blocks 522 and 524 at least the PAN and the password is transmitted to a POS device 110 through, for example, a NFC transponder. The password may alternatively be displayed to a user on the display of the mobile device and then may be transmitted to the POS device 110 by the user, for example, through a keypad. Other information about the account may also be transmitted to the POS device 110, such as, for example, expiration date, name of the account holder, transaction amount limitations, issuing financial institution information, network routing information, etc.

The POS device 110 may receive the PAN and the password from the mobile device 124 at blocks 526 and 528. The PAN and password may be transmitted and received through NFC transponders. In some embodiments, the PAN is transmitted through NFC transponders while the password is received through a keypad or touch screen. As part of settling the transaction, the POS device may require authentication or confirmation of the transaction. POS devices, in general, communicate with acquirer systems 112 in order to authenticate and approve transactions based on account information.

The POS device may request authentication of the user from the acquirer by requesting authentication from the acquirer system 112 at block 530. The authentication request may include the PAN and the password. The authentication request may also include other transaction details, such as, for example, transaction amount, transaction time, account holder name, issuer name or id, etc. The acquirer system 112 may receive the request at block 532 and then authenticate the user by comparing the password received from the user and/or mobile device 124 through the POS device 110 with the password stored at the mobile wallet server 210 at block 534. If the passwords do not match, the transaction is canceled at block 536; the POS device 110 is notified at block 538 and the mobile device 134 is notified at block 540. If the passwords do match at block 534, a confirmation may be sent to the POS device 110 at block 542 and received at the POS device 110 at block 544. The acquirer system 112 may also approve the transaction through a financial institution based on the available funds, credit or stored value. Such approval may run in parallel or serially with the password authentication. The POS device 110 may prepare and send an electronic receipt to the mobile device at block 546 that is received by the mobile device at block 548.

Figure 7:
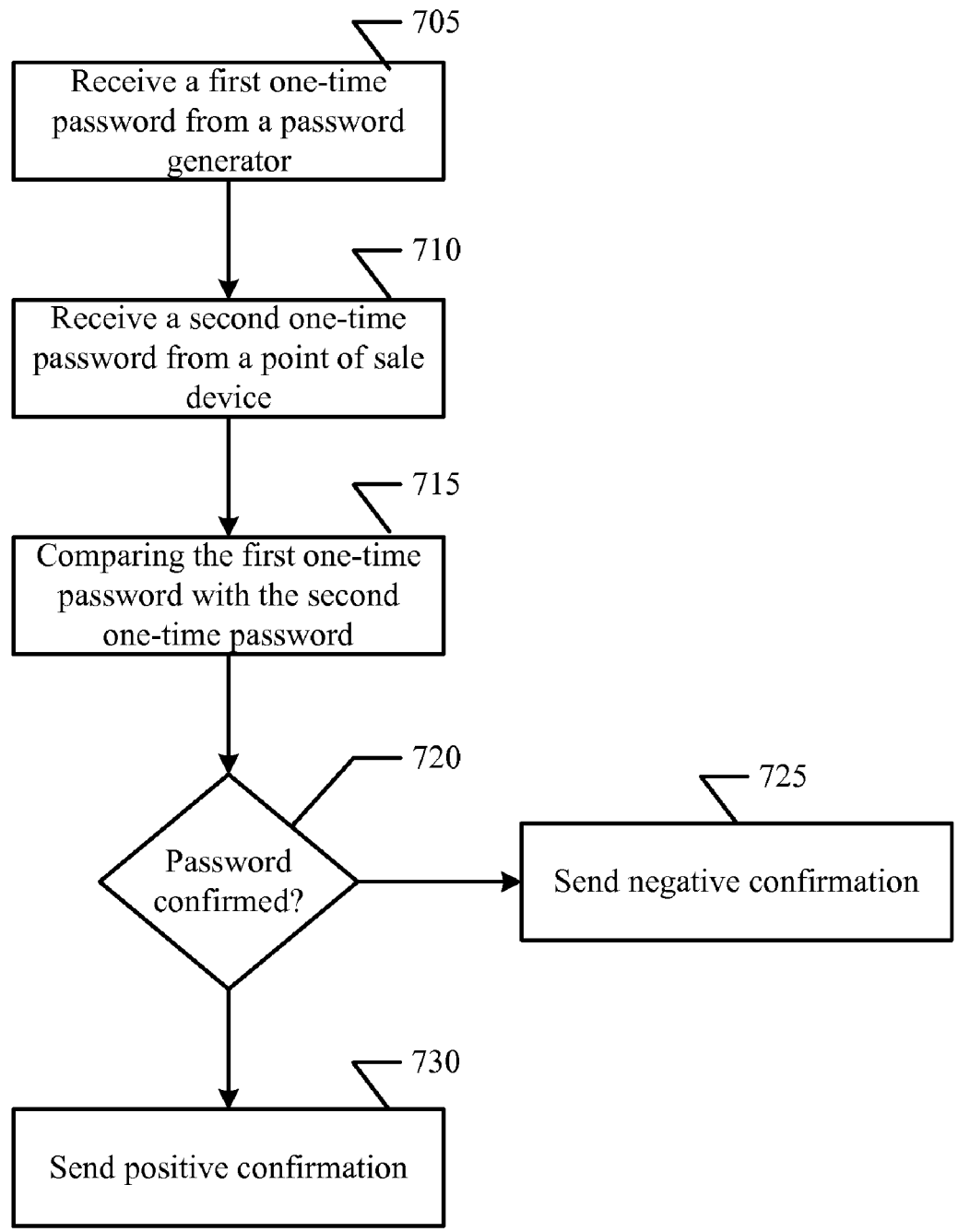
FIG. 7 is a flowchart showing the comparison of a password from a password generator and a password from a POS according to one embodiment.

FIG. 7 is a flowchart showing the authentication of a password from a password generator and a password from a POS according to one embodiment. A first password is received from a password generator at block 705. The password generator may systematically communicate passwords to the financial institution, for example, as the passwords change. Passwords may also be sent in response to a request by the financial institution or other authenticating agent. A second password is received from a POS at block 710. This second password is the password that is being authenticated. The two passwords are compared at block 715. If the passwords match, as determined in block 720, confirmation is confirmed or denied at blocks 725, 730.

Figure 8:
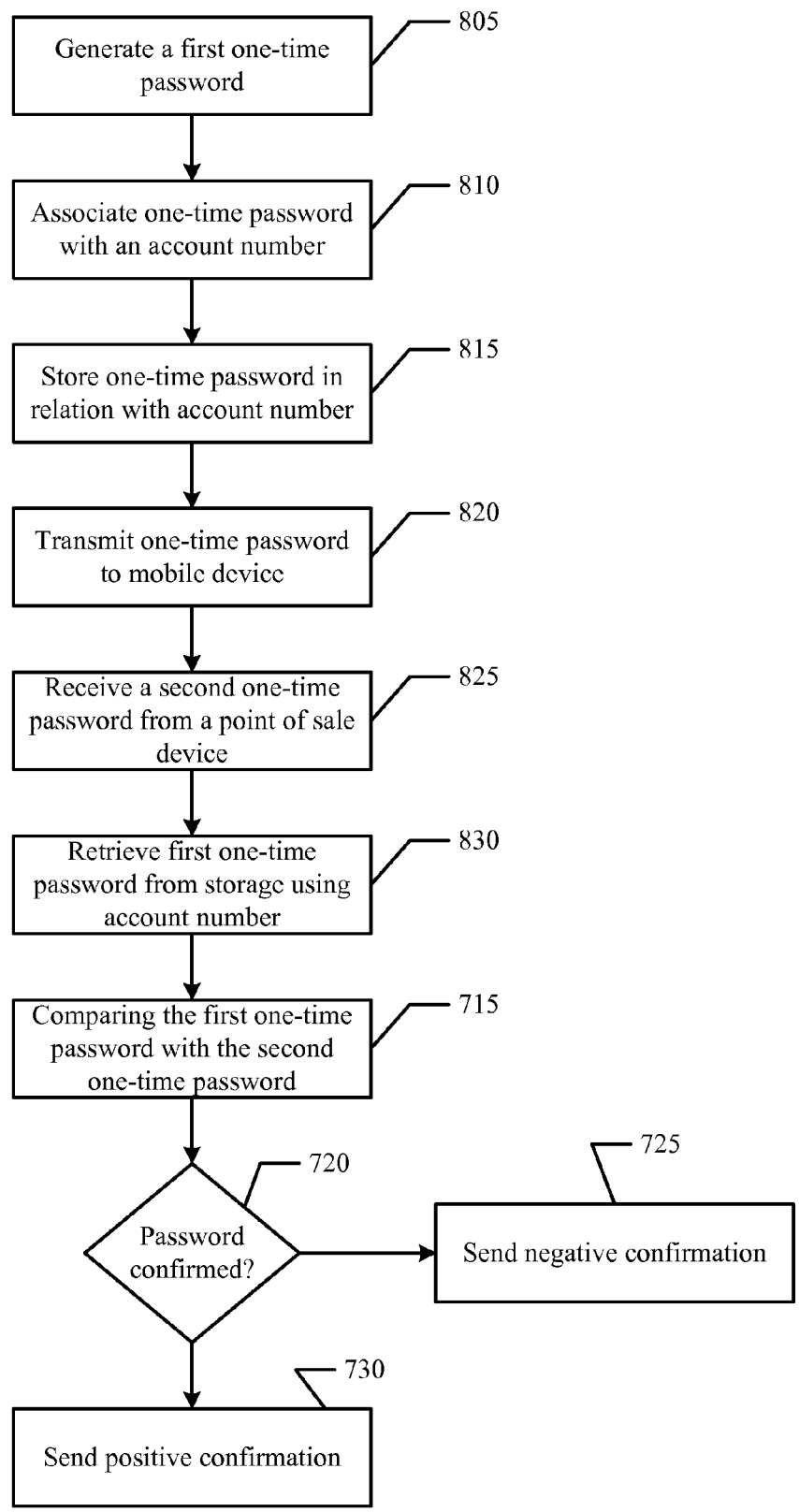
FIG. 8 is a flowchart showing the association of a password and an account number according to one embodiment.

FIG. 8 is a flowchart showing the association of a password and an account number and authenticating the password according to one embodiment. A first password is generated at block 805, associated with an account number at block 810 and stored in memory in relation with the account number at block 815. The password is transmitted to a mobile device associated with the password at block 820. A second password is received from a POS at block 825. This second password may be a password that the POS received from the mobile device in response to a payment request. The second password may be associated with the account number. Using the account number, the first password is retrieved from memory at block 830 and compared with the second password at block 715. If the passwords match, as determined in block 720, confirmation is confirmed or denied at blocks 725, 730.

Figure 9:
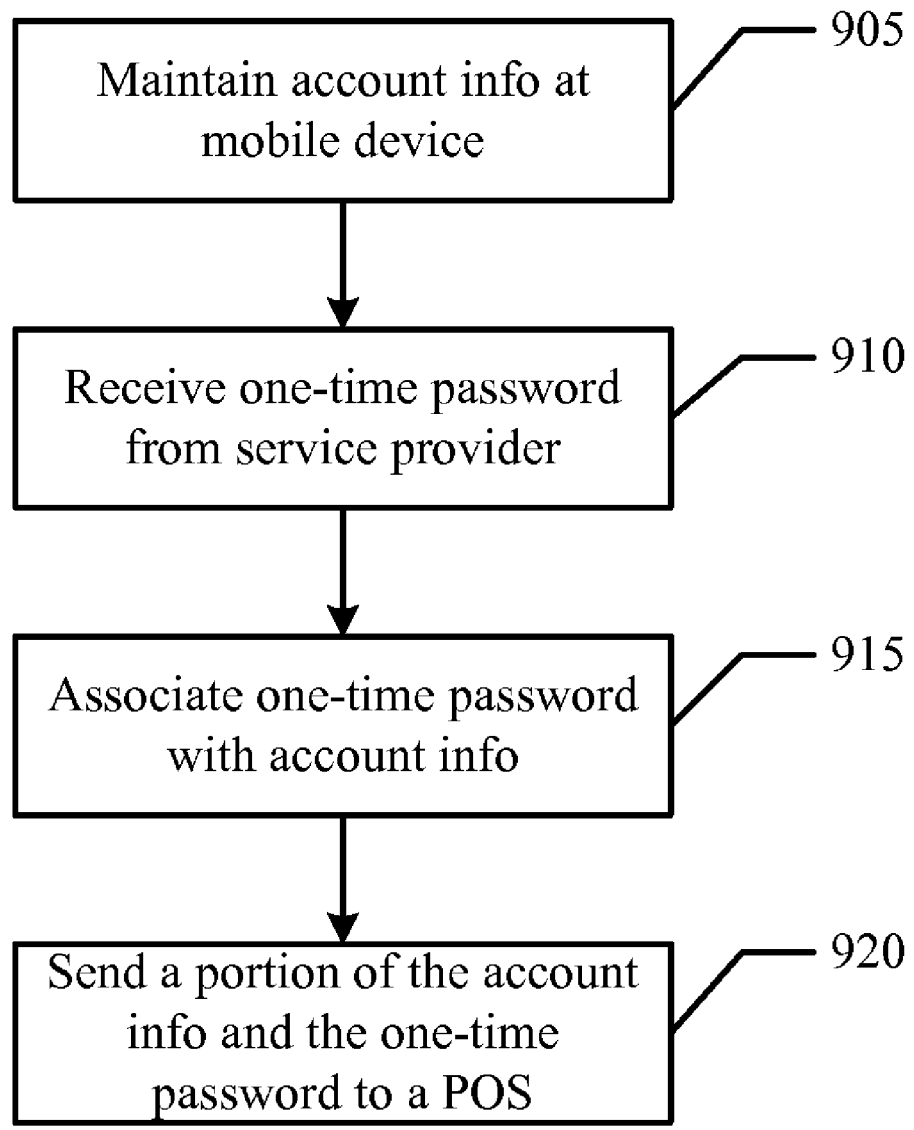
FIG. 9 is a flowchart showing how an account is maintained at a mobile device and have a password associated therewith.

FIG. 9 is a flowchart showing how an account is maintained at a mobile device and how to associate a password therewith. Account information is maintained at a mobile device for one or more accounts at block 905. The mobile device receives a password from a service provider at block 910 and associates the password with an account at block 915. This account information and/or password may then be transmitted to POS in response to a request for payment at block 920.

Figure 10:
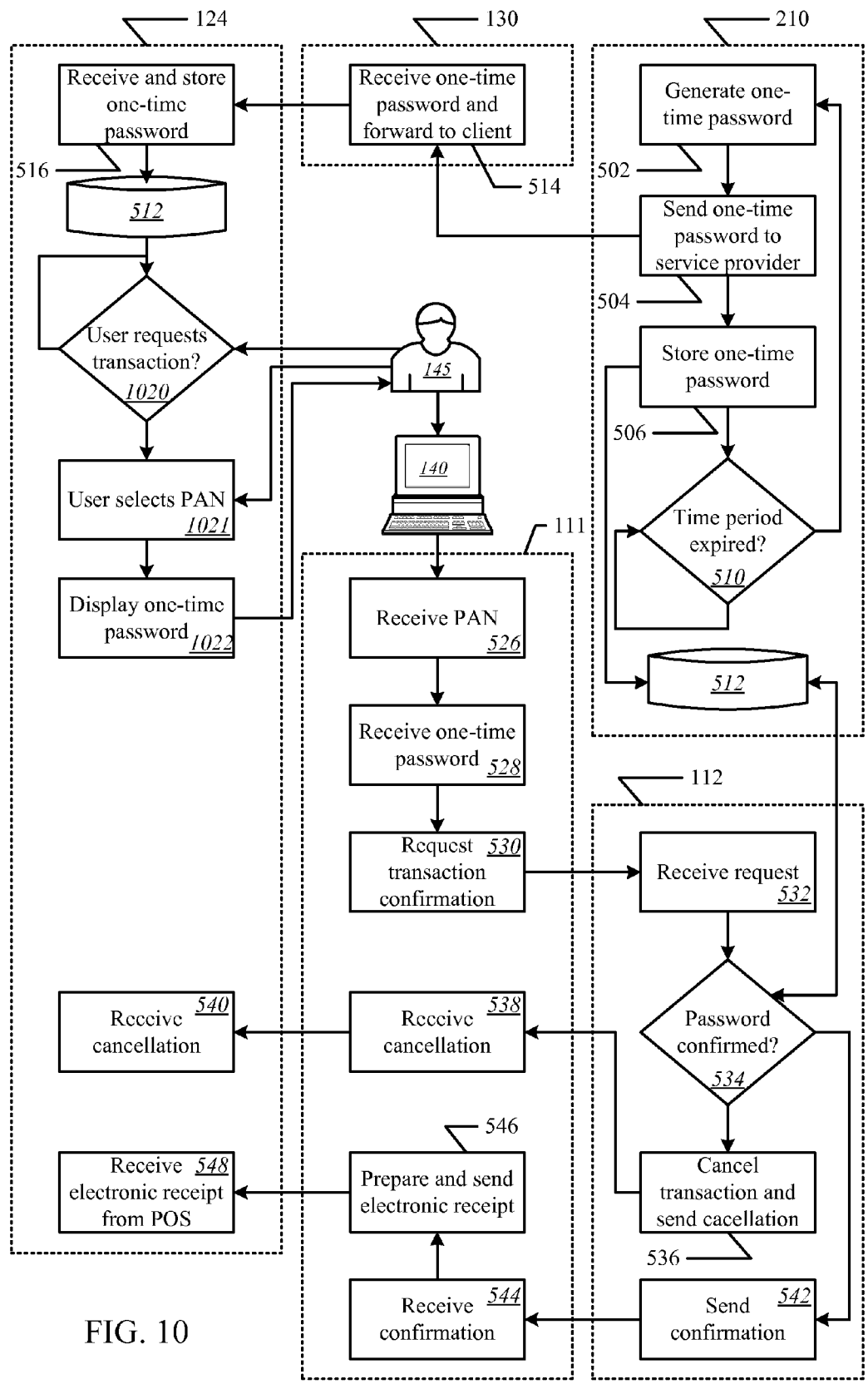
FIG. 10 is a flowchart showing a method for using a password for online purchases according to one embodiment.
Figure 11:
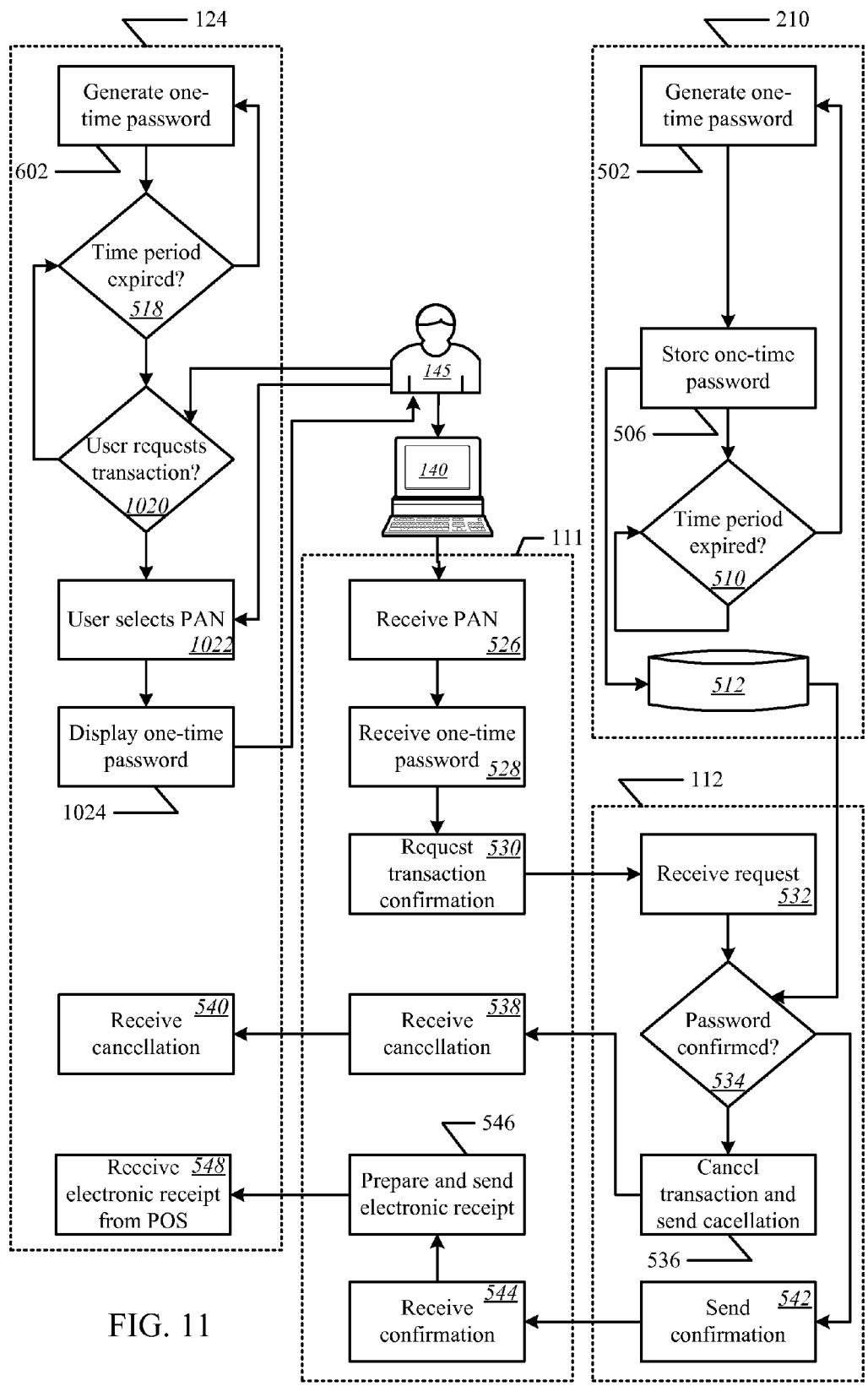
FIG. 11 is another flowchart showing a method for using a password for online purchases according to one embodiment.

FIG. 10 is a flowchart showing a method for using a password for online purchases according to one embodiment. This is similar to the flowchart shown in FIG. 5. The user 145 may be making a payment through their computer 140 at an online merchant's web server 111. Passwords are received and stored at the mobile device 124. When the user 145 requests a transaction, at block 1020, the mobile device may request the user to select a PAN from which a user may wish to use for an online transaction at block 1021. The mobile device may also wait until the user selects a PAN. In some embodiments a user may have the same password for all accounts or the password may vary depending on the PAN selected. Once a PAN is selected a password is displayed to the user 145 at block 1022. The user may then enter this password and PAN in the user's computer 140, which may then transmit this information to the online merchant web server where it is received at blocks 526, 528. As can be seen throughout the rest of the flowchart, the password generation and confirmation are similar to what is shown and discussed in regard to FIG. 5. FIG. 11 shows an example of a flowchart similar to the one shown in FIG. 6 with a user using a password at an online merchant.

Various modifications, additional steps, and a reduction in steps may be implemented in the flowcharts shown in FIGS. 5-9. Moreover, while some processes and/or decisions are shown occurring in some components, such processes and/or decisions may occur in other existing or additional components.

Figure 12:
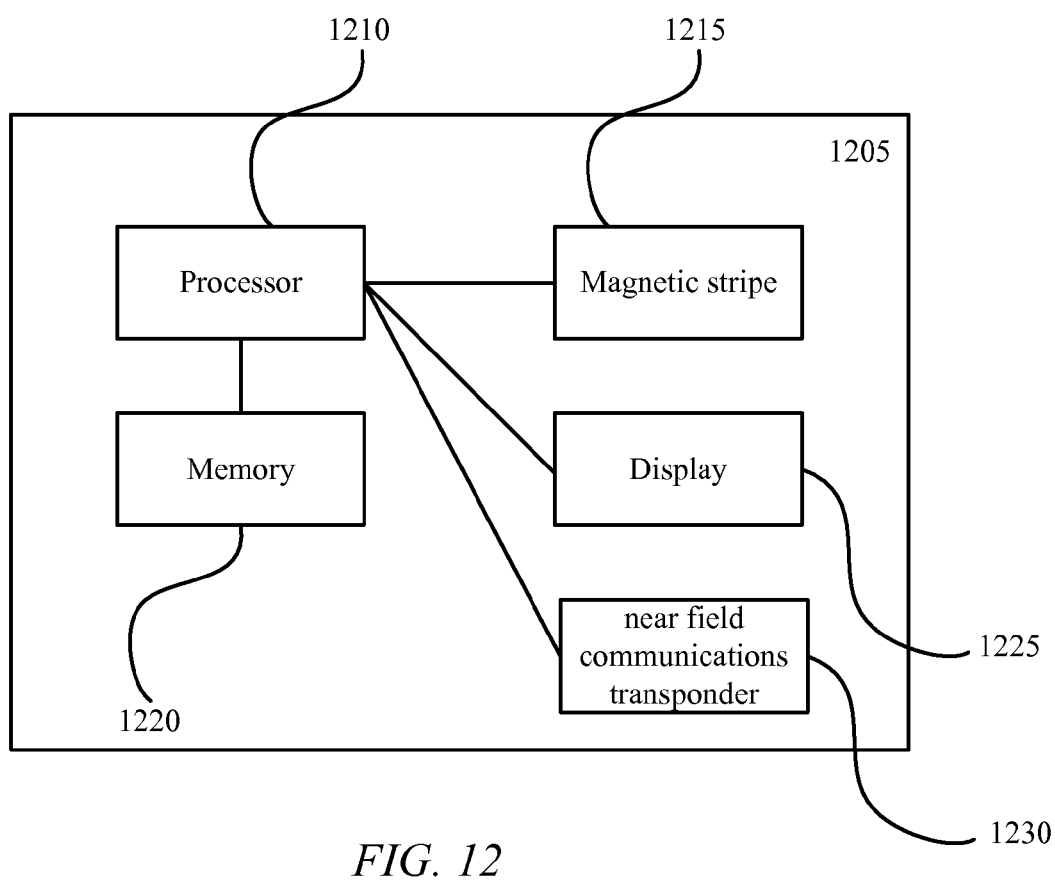
FIG. 12 is a block diagram of a transaction card with a processor, memory, display, and magnetic stripe according to one embodiment.

FIG. 12 is a block diagram of a transaction card 1205 with a processor 1210, memory 1220, display 1225, and a magnetic stripe 1215 according to one embodiment. Transaction card 1205, for example, may be a debit card, credit card, bank card, etc. The transaction card 1205 may conform to the standards provided, for example, in ISO 7810, 7811, 7813 and/or 7816. Processor 1210 and memory 1220 may comprise a single IC circuit or chip. The IC circuit or chip may include a virtual magnetic stripe image that contains information the same as or similar to magnetic stripe 1215. Moreover, processor 1210 and memory 1220 may also comprise a one-time password module. For example, processor 1210 and memory 1220 may provide one-time passwords using the OATH open standard. In some embodiments, magnetic stripe 1215 may be replaced with a near field communications transponder. For example, the near field communications transponder may include an RFID chip, a contactless smart card, a contact smart card, a proximity chip, and/or a MIFARE type chip. In other embodiments, transaction card 1205 may include both a magnetic stripe and near field communications transponder 1230.

As shown, processor 1210 and memory 1220 may be communicatively coupled together. Thus, processor 1210 may access and/or store data in memory 1220. For example, processor 1210 may store and/or retrieve passwords to and from memory 1220. Processor 1210 may also be coupled with magnetic stripe 1215, display 1225 and/or a near field communications transponder 1230. Processor 1210 may provide passwords to magnetic stripe 1215, display 1225 and/or near field communications transponder 1230. When sending the password to magnetic stripe 1215 and/or near field communications transponder 1230, processor 1210 may append the password with a partial transaction account number to create a pseudo account number. Moreover, processor 1210 may also calculate and send a dynamic card verification value (dCVV) and/or a time value that reflects the time the password and/or the dCVV were calculated. Furthermore, the password, dCVV and/or time value may be sent to a point of sale device via magnetic stripe 1215 and/or near field communications transponder 1230. Transmission to the point of sale device may utilize various fields of a typical data packet. For example, such data may be transmitted within the name filed or other field to keep the password and/or dCVV from being printed on a receipt.

Display 1225 may include any type of electro-optical display capable of displaying alphanumeric characters. In some embodiments, the display may also display graphics. Any suitable electro-optic display capable of displaying the graphic image file may be used, but in certain embodiments, the electro-optic display is selected from the group consisting of a flexible LCD screen, a light emitting polymer (LEP) display, and electronic paper, as generally known in the art. Examples of suitable electro-optic displays are described, e.g., in U.S. Patent Publication 2005/0122565 and the documents cited therein, which are herein incorporated by reference. In other embodiments, the electro-optic display may comprise a display screen, a fiber optic, and a projector mechanism, wherein the projector mechanism is configured to project the graphic image file to the fiber optic, and the fiber optic is interfaced with the display screen so as to project the graphic image onto the display screen for display of the graphic image file on the screen.

Other suitable electro-optic displays include electronic paper, such as those developed by E-Ink, Gyricon and Kent Graphics. Several approaches have been developed for potential applications of electronic paper including: thermochromism, electrochromic, electroluminescent polymers and magnetic particle systems. By way of example, E-Ink is a technology based on electrophoretics that uses microcapsules, about. 30-300 μm in diameter, for encasing electrophoretic materials. These spheres are tightly packed between 2 plastic sheets. The spheres contain tiny white pigment chips, suspended in a blue-black liquid dye. Applying a field moves the particles, and the microcapsules can be switched into reflecting or absorbing mode by applying a positive or negative voltage across electrodes.

Gyricon is a product of Gyricon Media, a spin-off of Xerox located at the Palo Alto Research Center. Gyricon displays are made of millions of bichromal beads embedded between 2 plastic sheets by a flexible elastomeric matrix of oil filled cavities. The beads have contrasting hemispheres, white on one side (highly reflective) and black on other (absorbs light). The beads reside in their cavities, and on application of a voltage, they can present one or the other side to the viewer. An intermediate level switching voltage can produce grayscale images. The plastic sheets can be produced in rolls like old fashioned paper while the balls are made by spraying molten wax-like plastics on opposite sides of a spinning disk. Ball diameters are determined by spinning speeds.

Kent Displays are based on a kind of a liquid crystal display (LCD), which is called a cholesteric LCD because the liquid crystal material which it uses was derived from actual animal cholesterol. Cholesteric LCD material is sandwiched between two conducting electrodes and can be switched between two stable states—focal conic and planar states. By selectively reflecting different wavelengths, they produce color. Unlike, TN-LCDs used in laptops today, cholesteric LCDs appear bright in bright light just like paper. The pixels can be switched from conic to planar state or back by application of about 20-30V. Since it does not use polarizers and color filters, wide viewing angles and high brightness and contrast are obtained that are claimed to be comparable with newsprint. The display cell acts as a collection of tiny mirrors, each reflecting about 50% of the incident light. The resulting total reflection approaches 40% of the incident light. While it is not as good as paper which reflects at least 80%, compared to other reflective displays, the Ch-LCD does reflect more light than other systems. Its contrast ratio (normally 20 to 1) gets even better when taken out into the sunlight due to its reflective nature. This display is also claimed to show videos as it can be switched within 30 milliseconds.

Figure 13A:
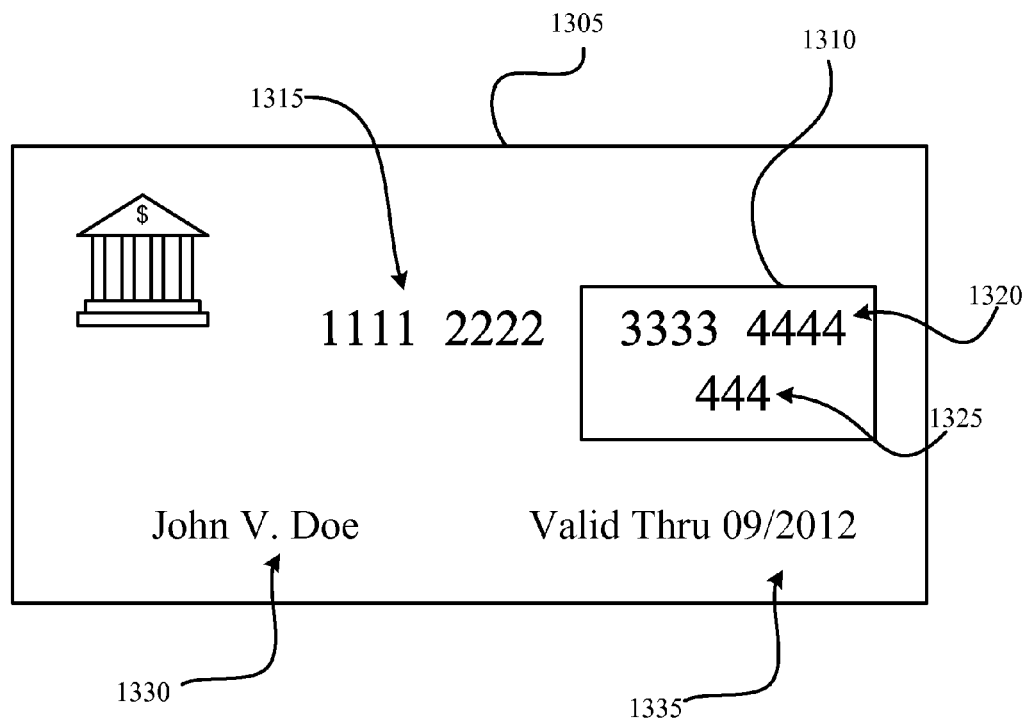
FIGS. 13A and 13B show the front side and the back side of an example of a transaction card according to some embodiments.
Figure 13B:
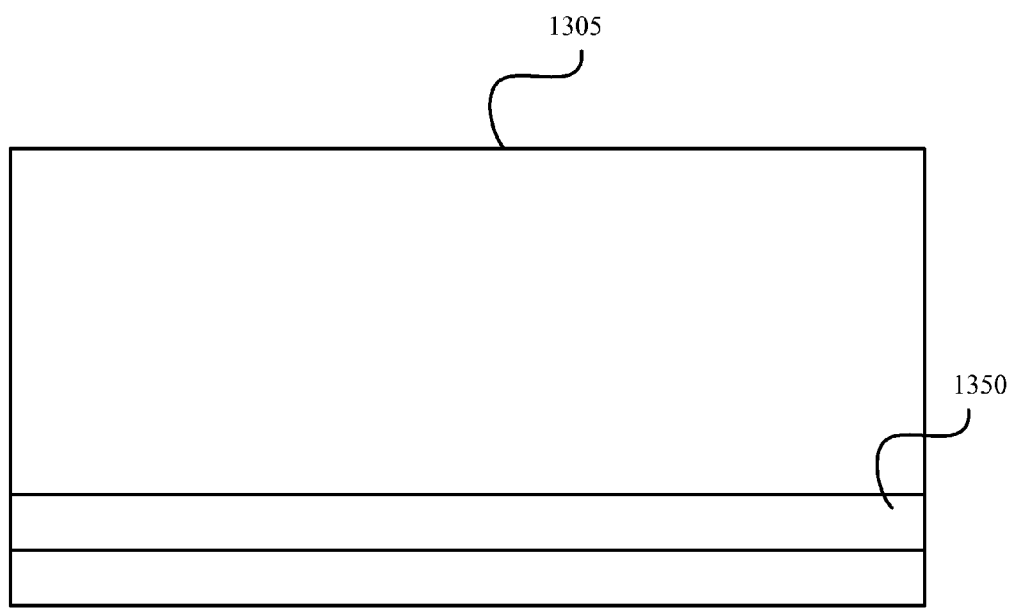

FIGS. 13A and 13B show the front side and the back side of an example of a transaction card 1305 according to some embodiments. The front side of a transaction card 1305 is shown in FIG. 13A. In this example, the card holder's name 1330 and an expiration date 1335 is shown on the front surface of the card. Partial transaction account number 1315 is also provided on the front surface of the card. Digital display 1310 is also shown with a second portion of a transaction account number 1320 and a dynamic card verification value (dCVV) 1325. The second portion of a transaction account number 1320 may be a password. The second portion of a transaction account number 1320 and the dCVV may be calculated by a processor or IC chip. Moreover, the second portion of a transaction account number 1320 and the dCVV 1325 may change at set intervals of time. For example, the second portion of a transaction account number 1320 and the dCVV 1325 may change every four minutes. As another example, the transaction card 1305 may include a switch, button or activation area that triggers the processor to provide or recalculate the second portion of a transaction account number 1320 and the dCVV 1325. The second portion of a transaction account number 1320 and the dCVV 1325 may be calculated using a function based on the time of day and/or the expiration date of the transaction card 1305. Moreover, a public and/or private key or keys may be used by the processor to calculate the second portion of a transaction account number 1320 and/or the dCVV 1325. In yet other embodiments, any type of symmetrical cryptography may also. For example, algorithms that conform or mimic the OATH open standard.

The transaction card 1305 may be used for secure online transactions. In some embodiments, a user may provide pseudo account number to an online merchant as part of a transaction. The pseudo account number, for example, may include the partial transaction account number 1315 printed on the front surface of the transaction card and the second portion of a transaction account number 1320 in the display 1310. In some embodiments, the expiration date is also provided. Upon receipt, the card processor and/or financial institution may use a variety of factors to decode the password and provide a transaction account number. In some embodiments, the time and/or the expiration date may be used to determine the transaction account number from the pseudo account number.

Figure 14:
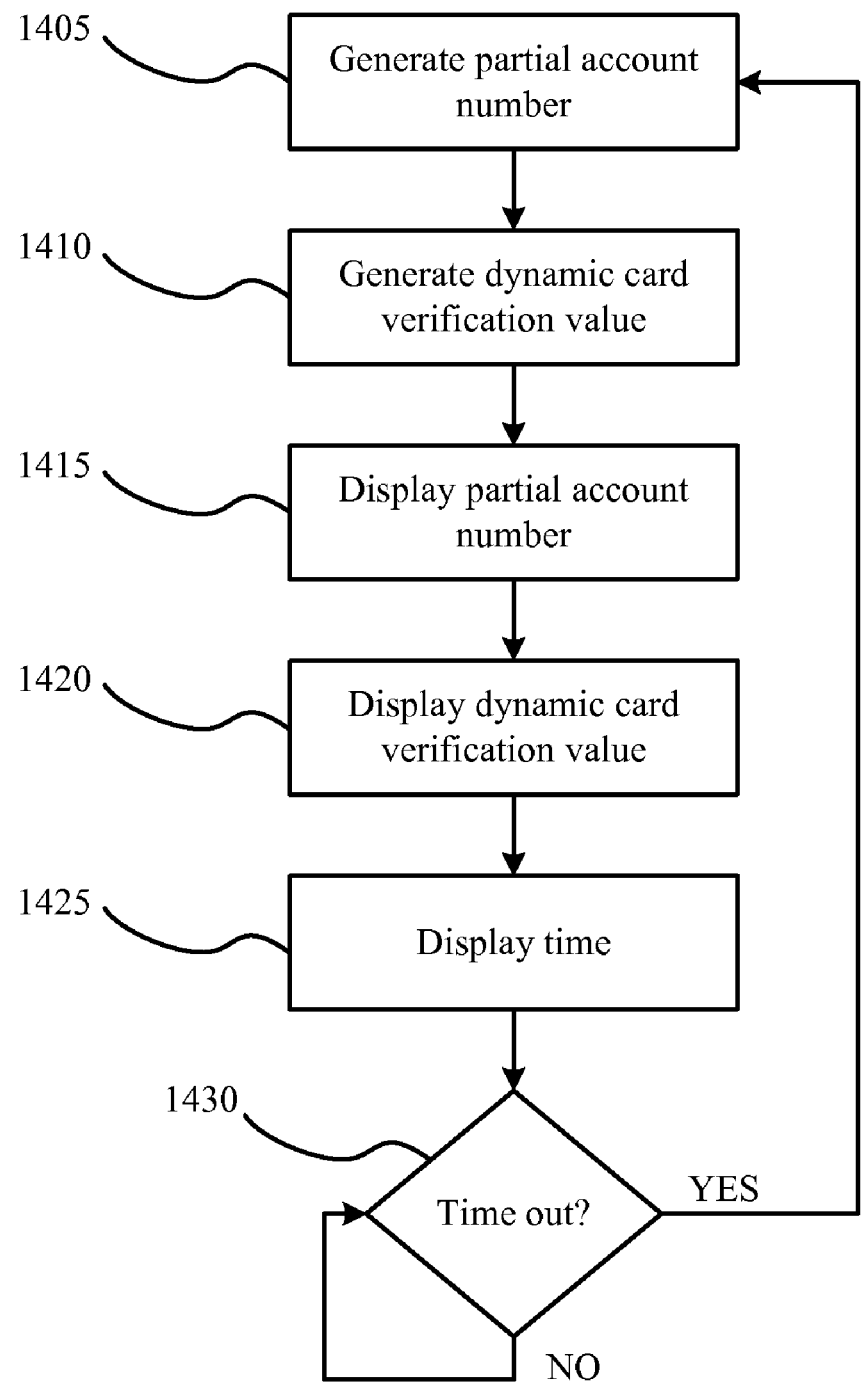
FIG. 14 shows a flowchart of a transaction card providing passwords using a digital display according to one embodiment.

FIG. 14 shows a flowchart of a transaction card providing passwords using a digital display according to one embodiment. At block 1405 a partial account number (or password) is generated by the processor a dynamic card verification value may also be generated at block 1410. Various algorithms and/or keys may be used to generate the partial account number and the dynamic card verification value. Moreover, separate algorithms may be used to calculate these values.

At blocks 1415, 1420, and 1425 the transaction card may display the partial account number, the dynamic card verification value, and/or the time value used in generating the partial account number and the dynamic card verification number. In some embodiments, the transaction card may display one or two of these values.

Figure 15:
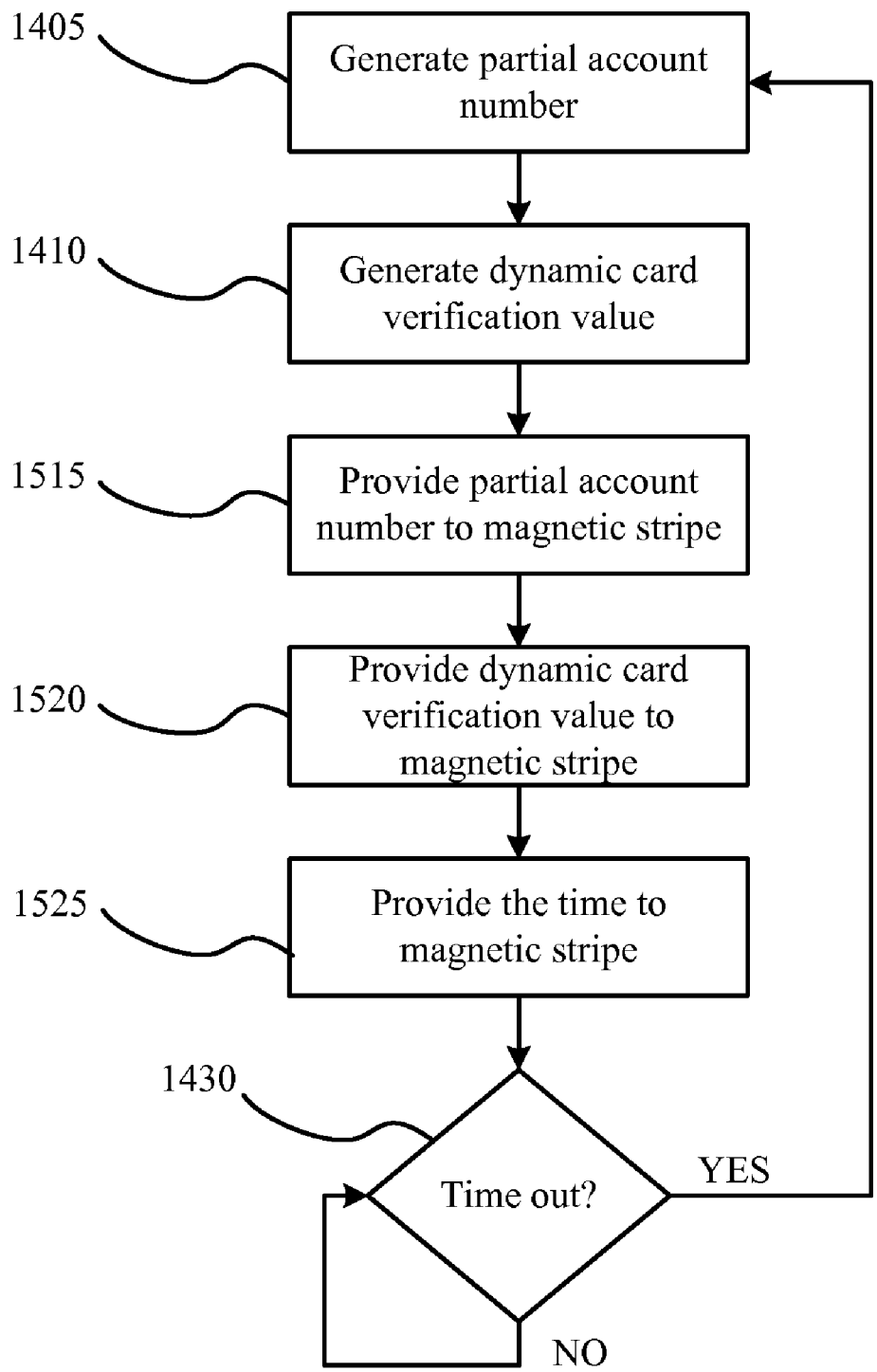
FIG. 15 shows a flowchart of a transaction card providing passwords in a transaction according to one embodiment.

FIG. 15 shows a flowchart of a transaction card providing passwords in a transaction according to one embodiment. A partial account number and a dynamic card verification value are calculated at block 1405 and 1410, following which, the partial account number, dynamic card verification value, and the time are provided to a magnetic stripe (such as magnetic stripe 1350 shown in FIG. 13B) and/or a near field communications transponder at blocks 1515, 1520 and 1525. These values may then be communicated to a point of sale device to complete a transaction. The partial account number, for example, may be combined with another portion of the account number to create a pseudo account number prior to transmission. After some set period of time, the transaction card times out at block 1430 and new values are calculated at block 1405 and 1410. The flowcharts shown in FIGS. 14 and 15 may be combined in one chip with both a display and a magnetic stripe or near field communications transponder.

In some embodiments, when a transaction card communicates with a point of sale device, the one-time password or partial account number may be converted into alphanumeric characters and provided in the name field of the data communicated to the point of sale device. In some embodiments, a dCVV may be communicated in the CVV location. In other embodiments, the dCVV may also be communicated within the name field. In some embodiments, the time value used to calculate the one-time password and/or the dCVV may also be communicated within the name field. In other embodiments, the time value, the dCVV and/or the partial account number (or one-time password) may be communicated within a discretionary field.

In some embodiments, the processor may also calculate a dynamic PIN and display the dynamic PIN on the display. During a transaction after swiping the magnetic stripe or the near field transponder, the user may be required to provide the PIN to show that the card is present with the user. The PIN may dynamically change.

What is claimed is:

1. A onetime password server comprising:
an input-output interface;
memory; and a
a processor coupled with the input-output interface and the memory, wherein the processor includes instructions for
generating a first onetime password;
associating the first onetime password with a first account number;
looking up a mobile device phone number or identification number associated in the memory with the first account number;
transmitting the first onetime password to a mobile device through the input-output interface using the mobile device phone number or identification number;
receiving a second onetime password and a second account number from a point of sale device via the input-output interface;
determining whether the second onetime password and the first onetime password match;
in the event that the second onetime password and the first onetime password match, authenticating a transaction for use with the second account number; and
in the event that the second onetime password and the first onetime password do not match, denying authentication of a transaction for use with the second account number.

2. The onetime password server according to claim 1 wherein the processor further comprises instructions for storing the first onetime password in a relationship with the first account number in the memory.

3. The onetime password server according to claim 2 wherein the processor further comprises instructions for retrieving from the memory the first onetime password using the second account number.

4. The onetime password server according to claim 1 wherein the processor further comprises instructions for looking up a mobile device address associated in the memory with the first account number, wherein the onetime password is transmitted to the mobile device address associated with the account number.

5. The onetime password server according to claim 1 wherein the second onetime password is received from a point of sale device via the input-output interface.

6. The onetime password server according to claim 1 wherein the second onetime password is received from a financial institution via the input-output interface.

7. The onetime password server according to claim 1 wherein the second onetime password and the second account number is received from a financial institution via the input-output interface.

8. A method occurring at a one time password server that includes a processor and memory, the method comprising:
generating a first onetime password;
storing the first onetime passwords in association with the account number in memory;
looking up a mobile device phone number or identification number associated in the memory with the first account number;
transmitting the first onetime password to a mobile device using the mobile device phone number or identification number;
receiving a second onetime password and a second account number from a point of sale device;
retrieving a stored onetime password from memory associated with the second account number;
determining whether the second onetime password and the stored onetime password match;
in the event that the second onetime password and the stored onetime password match, authenticating a transaction for use with the second account number; and
in the event that the second onetime password and the stored onetime password do not match, denying authentication a transaction for use with the second account number.

* * * * *